(12) United States Patent
Versace et al.

(10) Patent No.: US 10,503,976 B2
(45) Date of Patent: Dec. 10, 2019

(54) METHODS AND APPARATUS FOR AUTONOMOUS ROBOTIC CONTROL

(71) Applicant: Neurala, Inc., Boston, MA (US)

(72) Inventors: Massimiliano Versace, Boston, MA (US); Anatoly Gorshechnikov, Newton, MA (US)

(73) Assignee: Neurala, Inc., Boston, MA (US)

( * ) Notice: Subject to any disclaimer, the term of this patent is extended or adjusted under 35 U.S.C. 154(b) by 175 days.

(21) Appl. No.: 15/463,299

(22) Filed: Mar. 20, 2017

(65) Prior Publication Data

US 2017/0193298 A1    Jul. 6, 2017

Related U.S. Application Data

(63) Continuation of application No. 14/662,657, filed on Mar. 19, 2015, now Pat. No. 9,626,566.
(Continued)

(51) Int. Cl.
*G06K 9/00* (2006.01)
*B25J 9/16* (2006.01)
(Continued)

(52) U.S. Cl.
CPC ........ *G06K 9/00664* (2013.01); *B25J 9/1697* (2013.01); *G06K 9/3241* (2013.01);
(Continued)

(58) Field of Classification Search
None
See application file for complete search history.

(56) References Cited

U.S. PATENT DOCUMENTS 5,063,603 A    11/1991    Burt
5,136,687 A    8/1992    Edelman et al.
(Continued)

FOREIGN PATENT DOCUMENTS

EP          1 224 622 B1    7/2002
WO    WO 2014/190208      11/2014
(Continued)

OTHER PUBLICATIONS

Berenson, D. et al., A robot path planning framework that learns from experience, 2012 International Conference on Robotics and Automation, 2012, 9 pages [retrieved from the internet] URL:http://users.wpi.edu/-dberenson/lightning.pdf.
(Continued)

*Primary Examiner* — Atiba O Fitzpatrick
(74) *Attorney, Agent, or Firm* — Smith Baluch LLP

(57) ABSTRACT

Sensory processing of visual, auditory, and other sensor information (e.g., visual imagery, LIDAR, RADAR) is conventionally based on "stovepiped," or isolated processing, with little interactions between modules. Biological systems, on the other hand, fuse multi-sensory information to identify nearby objects of interest more quickly, more efficiently, and with higher signal-to-noise ratios. Similarly, examples of the OpenSense technology disclosed herein use neurally inspired processing to identify and locate objects in a robot's environment. This enables the robot to navigate its environment more quickly and with lower computational and power requirements.

23 Claims, 7 Drawing Sheets

Related U.S. Application Data

(60) Provisional application No. 61/955,756, filed on Mar. 19, 2014.

(51) Int. Cl.

| | | |
|---|---|---|
| *G06K 9/32* | (2006.01) | |
| *G06N 3/04* | (2006.01) | |
| *G06K 9/46* | (2006.01) | |
| *G06T 7/73* | (2017.01) | |
| *G06T 7/11* | (2017.01) | |
| *G06T 7/292* | (2017.01) | |
| *G06T 7/187* | (2017.01) | |
| *G06T 7/194* | (2017.01) | |
| *G06N 3/08* | (2006.01) | |
| *G06N 3/00* | (2006.01) | |

(52) U.S. Cl.
CPC ......... *G06K 9/4628* (2013.01); *G06N 3/0409* (2013.01); *G06N 3/049* (2013.01); *G06N 3/088* (2013.01); *G06T 7/11* (2017.01); *G06T 7/187* (2017.01); *G06T 7/194* (2017.01); *G06T 7/292* (2017.01); *G06T 7/74* (2017.01); *G05B 2219/39082* (2013.01); *G06N 3/008* (2013.01); *G06T 2207/30244* (2013.01)

(56) References Cited

U.S. PATENT DOCUMENTS

| | | | |
|---|---|---|---|
| 5,172,253 | A | 12/1992 | Lynne |
| 5,388,206 | A | 2/1995 | Poulton et al. |
| 6,018,696 | A | 1/2000 | Matsuoka et al. |
| 6,336,051 | B1 | 1/2002 | Pangels et al. |
| 6,647,508 | B2 | 11/2003 | Zalewski et al. |
| 7,765,029 | B2 | 7/2010 | Fleischer et al. |
| 7,861,060 | B1 | 12/2010 | Nickolls et al. |
| 7,873,650 | B1 | 1/2011 | Chapman et al. |
| 8,392,346 | B2 | 3/2013 | Ueda et al. |
| 8,510,244 | B2 | 8/2013 | Carson et al. |
| 8,583,286 | B2 | 11/2013 | Fleischer et al. |
| 8,648,828 | B2 | 2/2014 | Gorchetchnikov et al. |
| 9,031,692 | B2 | 5/2015 | Zhu |
| 9,177,246 | B2 | 11/2015 | Buibas et al. |
| 9,189,828 | B2 | 11/2015 | Gorchetchnikov et al. |
| 9,210,312 | B2 * | 12/2015 | Sablak ................ G06T 7/194 |
| 9,626,566 | B2 | 4/2017 | Versace et al. |
| 2002/0046271 | A1 | 4/2002 | Huang |
| 2002/0050518 | A1 | 5/2002 | Roustaei |
| 2002/0056124 | A1 * | 5/2002 | Hay .................... G06K 9/00 725/87 |
| 2002/0064314 | A1 | 5/2002 | Comaniciu et al. |
| 2002/0168100 | A1 | 11/2002 | Woodall |
| 2003/0026588 | A1 | 2/2003 | Elder et al. |
| 2003/0078754 | A1 | 4/2003 | Hamza |
| 2004/0015334 | A1 | 1/2004 | Ditlow et al. |
| 2005/0166042 | A1 | 7/2005 | Evans |
| 2006/0184273 | A1 | 8/2006 | Sawada et al. |
| 2007/0052713 | A1 | 3/2007 | Chung et al. |
| 2007/0198222 | A1 | 8/2007 | Schuster et al. |
| 2007/0279429 | A1 | 12/2007 | Ganzer |
| 2008/0033897 | A1 | 2/2008 | Lloyd |
| 2008/0066065 | A1 | 3/2008 | Kim et al. |
| 2008/0117720 | A1 | 5/2008 | Gorchetchnikov et al. |
| 2008/0258880 | A1 | 10/2008 | Smith et al. |
| 2009/0080695 | A1 | 3/2009 | Yang et al. |
| 2009/0089030 | A1 | 4/2009 | Sturrock et al. |
| 2009/0116688 | A1 | 5/2009 | Monacos et al. |
| 2010/0048242 | A1 | 2/2010 | Rhoads et al. |
| 2011/0004341 | A1 | 1/2011 | Sarvadevabhatla et al. |
| 2011/0173015 | A1 | 7/2011 | Chapman et al. |
| 2011/0279682 | A1 | 11/2011 | Li et al. |
| 2012/0072215 | A1 | 3/2012 | Yu et al. |
| 2012/0089552 | A1 | 4/2012 | Chang et al. |
| 2012/0197596 | A1 | 8/2012 | Comi |
| 2012/0316786 | A1 | 12/2012 | Liu et al. |
| 2013/0126703 | A1 | 5/2013 | Caulfield |
| 2013/0131985 | A1 | 5/2013 | Weiland et al. |
| 2014/0019392 | A1 | 1/2014 | Buibas et al. |
| 2014/0032461 | A1 | 1/2014 | Weng |
| 2014/0089232 | A1 | 3/2014 | Buibas et al. |
| 2014/0192073 | A1 | 7/2014 | Gorchetchnikov et al. |
| 2014/0052679 | A1 | 11/2014 | Sinyayskiy et al. |
| 2015/0127149 | A1 | 5/2015 | Sinyayskiy et al. |
| 2015/0134232 | A1 | 5/2015 | Robinson |
| 2015/0224648 | A1 | 8/2015 | Lee et al. |
| 2015/0269439 | A1 | 9/2015 | Versace et al. |
| 2016/0075017 | A1 | 3/2016 | Laurent et al. |
| 2016/0082597 | A1 | 3/2016 | Gorchetchnikov et al. |
| 2016/0096270 | A1 | 4/2016 | Ibarz Gabardos et al. |
| 2016/0156823 | A1 * | 6/2016 | Yoshida ................ H04N 5/772 348/143 |
| 2016/0198000 | A1 | 7/2016 | Gorchetchnikov et al. |
| 2017/0024877 | A1 | 1/2017 | Versace et al. |
| 2017/0076194 | A1 | 3/2017 | Versace et al. |

FOREIGN PATENT DOCUMENTS

| | | |
|---|---|---|
| WO | WO 2014/204615 | 12/2014 |
| WO | WO 2015/143173 | 9/2015 |
| WO | WO 2016/014137 | 1/2016 |

OTHER PUBLICATIONS

International Search Report and Written Opinion dated Jul. 6, 2017 from International Application No. PCT/US2017/029866, 12 pages.
Partial Supplementary European Search Report dated Jul. 4, 2017 from European Application No. 14800348.6, 13 pages.
Adelson, E. H., Anderson, C. H., Bergen, J. R., Burt, P. J., & Ogden, J. M. (1984). Pyramid methods in image processing. RCA engineer, 29(6), 33-41.
Aggarwal, Charu C, Hinneburg, Alexander, and Keim, Daniel A. On the surprising behavior of distance metrics in high dimensional space. Springer, 2001.
Ames, H, Versace, M., Gorchetchnikov, A., Chandler, B., Livitz, G., Léveillé, J., Mingolla, E., Carter, D., Abdalla, H., and Snider, G. (2012) Persuading computers to act more like brains. In Advances in Neuromorphic Memristor Science and Applications, Kozma, R.Pino,R., and Pazienza, G. (eds), Springer Verlag.
Ames, H. Mingolla, E., Sohail, A., Chandler, B., Gorchetchnikov, A., Léveillé, J., Livitz, G. and Versace, M. (2012) The Animat. IEEE Pulse, Feb. 2012, 3(1), 47-50.
Baraldi, A. and Alpaydin, E. (1998). Simplified ART: A new class of ART algorithms. International Computer Science Institute, Berkeley, CA, TR-98-004, 1998.
Baraldi, A. and Alpaydin, E. (2002). Constructive feedforward ART clustering networks—Part I. IEEE Transactions on Neural Networks 13(3), 645-661.
Baraldi, A. and Parmiggiani, F. (1997). Fuzzy combination of Kohonen's and ART neural network models to detect statistical regularities in a random sequence of multi-valued input patterns. In International Conference on Neural Networks, IEEE.
Baraldi, Andrea and Alpaydin, Ethem. Constructive feedforward ART clustering networks—part II. IEEE Transactions on Neural Networks, 13(3):662-677, May 2002. ISSN 1045-9227. doi: 10.1109/tnn.2002.1000131. URL http://dx.doi.org/10.1109/tnn.2002.1000131.
Bengio, Y., Courville, A., & Vincent, P. Representation learning: A review and new perspectives, IEEE Transactions on Pattern Analysis and Machine Intelligence, vol. 35 Issue 8, Aug. 2013, pp. 1798-1828.
Besl, P. J., & Jain, R. C. (1985). Three-dimensional object recognition. ACM Computing Surveys (CSUR), 17(1), 75-145.
Bradski, G., & Grossberg, S. (1995). Fast-learning Viewnet architectures for recognizing three-dimensional objects from multiple two-dimensional views. Neural Networks, 8 (7-8), 1053-1080.
Canny, J.A. (1986). Computational Approach to Edge Detection, IEEE Trans. Pattern Analysis and Machine Intelligence, 8(6):679-698.

(56) References Cited

OTHER PUBLICATIONS

Carpenter, G.A. and Grossberg, S. (1987). A massively parallel architecture for a self-organizing neural pattern recognition machine. Computer Vision, Graphics, and Image Processing 37, 54-115.
Carpenter, G.A., and Grossberg, S. (1995). Adaptive resonance theory (ART). In M. Arbib (Ed.), The handbook of brain theory and neural networks. (pp. 79-82). Cambridge, M.A.: MIT press.
Carpenter, G.A., Grossberg, S. and Rosen, D.B. (1991). Fuzzy ART: Fast stable learning and categorization of analog patterns by an adaptive resonance system. Neural Networks 4, 759-771.
Carpenter, Gail A and Grossberg, Stephen. The art of adaptive pattern recognition by a self-organizing neural network. Computer, 21(3):77-88, 1988.
Coifman, R.R. and Maggioni, M. Diffusion wavelets. Applied and Computational Harmonic Analysis, 21(1):53-94, 2006.
Coifman, R.R., Lafon, S., Lee, A.B., Maggioni, M., Nadler, B., Warner, F., and Zucker, S.W. Geometric diffusions as a tool for harmonic analysis and structure definition of data: Diffusion maps. Proceedings of the National Academy of Sciences of the United States of America, 102(21):7426, 2005.
Dosher, B.A., and Lu, Z.L. (2010). Mechanisms of perceptual attention in precuing of location. Vision Res., 40(10-12). 1269-1292.
Extended European Search Report and Written Opinion dated Jun. 1, 2017 from European Application No. 14813864.7, 10 pages.
Fazl, A., Grossberg, S., and Mingolla, E. (2009). View-invariant object category learning, recognition, and search: How spatial and object attention are coordinated using surface-based attentional shrouds. Cognitive Psychology 58, 1-48.
Foldiak, P. (1990). Forming sparse representations by local anti-Hebbian learning, Biological Cybernetics, vol. 64, pp. 165-170.
Friston K., Adams R., Perrinet L., & Breakspear M. (2012). Perceptions as hypotheses: saccades as experiments. Frontiers in Psychology, 3 (151), 1-20.
Galbraith, B.V, Guenther, F.H., and Versace, M. (2015) A neural network-based exploratory learning and motor planning system for co-robots.Frontiers in Neuroscience, in press.
George, D. and Hawkins, J. (2009). Towards a mathematical theory of cortical micro-circuits. PLoS Computational Biology 5(10), 1-26.
Grossberg, S. (1973). Contour enhancement, short-term memory, and constancies in reverberating neural networks. Studies in Applied Mathematics 52, 213-257.
Grossberg, S., and Huang, T.R. (2009). ARTSCENE: A neural system for natural scene classification. Journal of Vision, 9 (4), 6.1-19. doi:10.1167/9.4.6.
Grossberg, S., and Versace, M. (2008) Spikes, synchrony, and attentive learning by laminar thalamocortical circuits. Brain Research, 1218C, 278-312 [Authors listed alphabetically].
Hasselt, Hado Van. Double q-learning. In Advances in Neural Information Processing Systems, pp. 2613-2621,2010.
Hinton, G. E., Osindero, S., and Teh, Y. (2006). A fast learning algorithm for deep belief nets. Neural Computation, 18, 1527-1554.
International Preliminary Report on Patentability in related PCT Application No. PCT/US2014/039162 filed May 22, 2014, dated Nov. 24, 2015, 7 pages.
International Preliminary Report on Patentability in related PCT Application No. PCT/US2014/039239 filed May 22, 2014, dated Nov. 24, 2015, 8 pages.
International Preliminary Report on Patentability dated Nov. 8, 2016 from International Application No. PCT/US2015/029438, 7 pages.
International Search Report and Written Opinion dated Feb. 18, 2015 from International Application No. PCT/US2014/039162, 12 pages.
International Search Report and Written Opinion dated Feb. 23, 2016 from International Application No. PCT/US2015/029438, 11 pages.
International Search Report and Written Opinion dated Nov. 26, 2014 from International Application No. PCT/US2014/039239, 14 pages.
International Search Report and Written Opinion dated Sep. 15, 2015 from International Application No. PCT/US2015/021492, 9 pages.
Itti, L., and Koch, C. (2001). Computational modelling of visual attention. Nature Reviews Neuroscience, 2 (3), 194-203.
Itti, L., Koch, C., and Niebur, E. (1998). A Model of Saliency-Based Visual Attention for Rapid Scene Analysis, 1-6.
Jarrett, K., Kavukcuoglu, K., Ranzato, M. A., & LeCun, Y. (Sep. 2009). What is the best multi-stage architecture for object recognition?. In Computer Vision, 2009 IEEE 12th International Conference on (pp. 2146-2153). IEEE.
Kompella, Varun Raj, Luciw, Matthew, and Schmidhuber, Jurgen. Incremental üslow feature analysis: Adaptive low-complexity slow feature updating from high-dimensional input streams. Neural Computation, 24(11):2994-3024, 2012.
Kowler, E. (2011). Eye movements: The past 25years. Vision Research, 51(13), 1457-1483. doi:10.1016/j.visres.2010.12.014.
Larochelle H., & Hinton G. (2012). Learning to combine foveal glimpses with a third-order Boltzmann machine. NIPS 2010, 1243-1251.
LeCun, Y., Kavukcuoglu, K., & Farabet, C. (May 2010). Convolutional networks and applications in vision. In Circuits and Systems (ISCAS), Proceedings of 2010 IEEE International Symposium on (pp. 253-256). IEEE.
Lee, D. D. and Seung, H. S. (1999). Learning the parts of objects by non-negative matrix factorization. Nature, 401(6755):788-791.
Lee, D. D., and Seung, H. S. (1997). "Unsupervised learning by convex and conic coding." Advances in Neural Information Processing Systems, 9.
Legenstein, R., Wilbert, N., and Wiskott, L. Reinforcement learning on slow features of high-dimensional input streams. PLoS Computational Biology, 6(8), 2010. ISSN 1553-734X.
Léveillé, J., Ames, H., Chandler, B., Gorchetchnikov, A., Mingolla, E., Patrick, S., and Versace, M. (2010) Learning in a distributed software architecture for large-scale neural modeling. BIONETICS10, Boston, MA, USA.
Livitz G., Versace M., Gorchetchnikov A., Vasilkoski Z., Ames H., Chandler B., Leveille J. and Mingolla E. (2011) Scalable adaptive brain-like systems, The Neuromorphic Engineer, : 10.2417/1201101.003500 Feb. 2011.
Livitz, G., Versace, M., Gorchetchnikov, A., Vasilkoski, Z., Ames, H., Chandler, B., Léveillé, J., Mingolla, E., Snider, G., Amerson, R., Carter, D., Abdalla, H., and Qureshi, S. (2011) Visually-Guided Adaptive Robot (ViGuAR). Proceedings of the International Joint Conference on Neural Networks (IJCNN) 2011, San Jose, CA, USA.
Lowe, D.G.(2004). Distinctive Image Features from Scale-Invariant Keypoints. Journal International Journal of Computer Vision archive vol. 60, 2, 91-110.
Lu, Z.L., Liu, J., and Dosher, B.A. (2010) Modeling mechanisms of perceptual learning with augmented Hebbian re-weighting. Vision Research, 50(4). 375-390.
Mahadevan, S. Proto-value functions: Developmental reinforcement learning. In Proceedings of the 22nd international conference on Machine learning, pp. 553-560. ACM, 2005.
Mishkin M, Ungerleider LG. (1982). "Contribution of striate inputs to the visuospatial functions of parieto-preoccipital cortex in monkeys," Behav Brain Res, 6 (1): 57-77.
Mnih, Volodymyr, Kavukcuoglu, Koray, Silver, David, Rusu, Andrei A, Veness, Joel, Bellemare, Marc G, Graves, Alex, Riedmiller, Martin, Fidjeland, Andreas K, Ostrovski, Georg, et al. Human-level control through deep reinforcement learning. Nature, 518(7540):529-533, Feb. 25, 2015.
Moore, Andrew W and Atkeson, Christopher G. Prioritized sweeping: Reinforcement learning with less data and less time. Machine Learning, 13(1):103-130, 1993.
Najemnik, J., and Geisler, W. (2009). Simple summation rule for optimal fixation selection in visual search. Vision Research. 49, 1286-1294.
Notice of Allowance dated Jul. 27, 2016 from U.S. Appl. No. 14/662,657.
Notice of Allowance dated Dec. 16, 2016 from U.S. Appl. No. 14/662,657.

(56) References Cited

OTHER PUBLICATIONS

Oja, E. (1982). Simplified neuron model as a principal component analyzer. Journal of Mathematical Biology 15(3), 267-273.

Raijmakers, M.E.J., and Molenaar, P. (1997). Exact ART: A complete implementation of an ART network Neural networks 10 (4), 649-669.

Ranzato, M. A., Huang, F. J., Boureau, Y. L., & Lecun, Y. (Jun. 2007). Unsupervised learning of invariant feature hierarchies with applications to object recognition. In Computer Vision and Pattern Recognition, 2007. CVPR'07. IEEE Conference on (pp. 1-8). IEEE.

Raudies, F., Eldridge, S., Joshi, A., and Versace, M. (Aug. 20, 2014). Learning to navigate in a virtual world using optic flow and stereo disparity signals. Artificial Life and Robotics, DOI 10.1007/s10015-014-0153-1.

Riesenhuber, M., & Poggio, T. (1999). Hierarchical models of object recognition in cortex. Nature Neuroscience, 2 (11), 1019-1025.

Riesenhuber, M., & Poggio, T. (2000). Models of object recognition. Nature neuroscience, 3, 1199-1204.

Rublee, E., Rabaud, V., Konolige, K., & Bradski, G. (2011). ORB: An efficient alternative to SIFT or SURF. In IEEE International Conference on Computer Vision (ICCV) 2011, 2564-2571.

Rumelhart D., Hinton G., and Williams, R. (1986). Learning internal representations by error propagation. In Parallel distributed processing: explorations in the microstructure of cognition, vol. 1, MIT Press.

Salakhutdinov, R., & Hinton, G. E. (2009). Deep boltzmann machines. In International Conference on Artificial Intelligence and Statistics (pp. 448-455).

Schaul, Tom, Quan, John, Antonoglou, Ioannis, and Silver, David. Prioritized experience replay. arXiv preprint arXiv: 1511.05952, Nov. 18, 2015.

Schmidhuber, J. (2010). Formal theory of creativity, fun, and intrinsic motivation (1990-2010). Autonomous Mental Development, IEEE Transactions on, 2(3), 230-247.

Schmidhuber, Jürgen. Curious model-building control systems. In Neural Networks, 1991. 1991 IEEE International Joint Conference on, pp. 1458-1463. IEEE, 1991.

Seibert, M., & Waxman, A.M. (1992). Adaptive 3-D Object Recognition from Multiple Views. IEEE Transactions on Pattern Analysis and Machine Intelligence, 14 (2), 107-124.

Sherbakov, L. and Versace, M. (2014) Computational principles for an autonomous active vision system. Ph.D., Boston University, http://search.proquest.com/docview/1558856407.

Sherbakov, L., Livitz, G., Sohail, A., Gorchetchnikov, A., Mingolla, E., Ames, H., and Versace, M. (2013a) CogEye: An online active vision system that disambiguates and recognizes objects. NeuComp 2013.

Sherbakov, L., Livitz, G., Sohail, A., Gorchetchnikov, A., Mingolla, E., Ames, H., and Versace, M (2013b) A computational model of the role of eye-movements in object disambiguation. Cosyne, Feb. 28-Mar. 3, 2013. Salt Lake City, UT, USA.

Smolensky, P. (1986). Information processing in dynamical systems: Foundations of harmony theory. In D. E.

Snider, G., Amerson, R., Carter, D., Abdalla, H., Qureshi, S., Laveille, J., Versace, M., Ames, H., Patrick, S., Chandler, B., Gorchetchnikov, A., and Mingolla, E. (2010) Adaptive Computation with Memristive Memory. IEEE Computer, vol. 44(2).

Spratling, M. W. (2008). Predictive coding as a model of biased competition in visual attention. Vision Research, 48(12):1391-1408.

Spratling, M. W. (2012). Unsupervised learning of generative and discriminative weights encoding elementary image components in a predictive coding model of cortical function. Neural Computation, 24(1):60-103.

Spratling, M. W., De Meyer, K., and Kompass, R. (2009). Unsupervised learning of overlapping image components using divisive input modulation. Computational intelligence and neuroscience.

Sprekeler, H. On the relation of slow feature analysis and laplacian eigenmaps. Neural Computation, pp. 1-16, 2011.

Sutton, R. S., and Barto, A. G. (1998). Reinforcement learning: An introduction(vol. 1, No. 1). Cambridge: MIT press.

Sutton, Richard S and Barto, Andrew G. Reinforcement learning: An introduction. MIT press, 1998.

Tong, F., Ze-Nian Li, (1995). Reciprocal-wedge transform for space-variant sensing, Pattern Analysis and Machine Intelligence, IEEE Transactions on , vol. 17, No. 5, pp. 500-551. doi: 10.1109/34.391393.

Torralba, A., Oliva, A., Castelhano, M.S., Henderson, J.M. (2006). Contextual guidance of eye movements and attention in real-world scenes: the role of global features in object search. Psychological Review, 113(4).766-786.

Van Hasselt, Hado, Guez, Arthur, and Silver, David. Deep reinforcement learning with double q-learning. arXiv preprint arXiv: 1509.06461, Sep. 22, 2015.

Versace, M. (2006) From spikes to interareal synchrony: how attentive matching and resonance control learning and information processing by laminar thalamocortical circuits. NSF Science of Learning Centers PI Meeting, Washington, DC, USA.

Versace, M., (2010) Open-source software for computational neuroscience: Bridging the gap between models and behavior. In Horizons in Computer Science Research,vol. 3.

Versace, M., Ames, H., Léveillé, J., Fortenberry, B., and Gorchetchnikov, A. (2008) KInNeSS: A modular framework for computational neuroscience. Neuroinformatics, 2008 Winter; 6(4):291-309. Epub Aug. 10, 2008.

Versace, M., and Chandler, B. (2010) MoNETA: A Mind Made from Memristors. IEEE Spectrum, Dec. 2010.

Webster, Bachevalier, Ungerleider (1994). Connections of IT areas TEO and TE with parietal and frontal cortex in macaque monkeys. Cerebal Cortex, 4(5), 470-483.

Wiskott, Laurenz and Sejnowski, Terrence. Slow feature analysis: Unsupervised learning of invariances. Neural Computation, 14(4):715-770, 2002.

Aryananda, L. 2006. Attending to learn and learning to attend for a social robot. Humanoids 06, pp. 618-623.

Bernhard, F., and Keriven, R. 2005. Spiking Neurons on GPUs. Tech. Rep. 05-15, Ecole Nationale des Ponts et Chaussés, 8 pages.

Bohn, C.-A. Kohonen. 1998. Feature Mapping Through Graphics Hardware. In Proceedings of 3rd Int. Conference on Computational Intelligence and Neurosciences, 4 pages.

Davis, C. E. 2005. Graphic Processing Unit Computation of Neural Networks. Master's thesis, University of New Mexico, Albuquerque, NM, 121 pages.

Extended European Search Report and Written Opinion dated Oct. 12, 2017 from European Application No. 14800348.6, 12 pages.

Extended European Search Report and Written Opinion dated Oct. 23, 2017 from European Application No. 15765396.5, 8 pages.

Ellias, S. A., and Grossberg, S. 1975. Pattern formation, contrast control and oscillations in the short term memory of shunting on-center off-surround networks. Biol Cybern 20, pp. 69-98.

Georgii, J., and Westermann, R. 2005. Mass-spring systems on the GPU. Simulation Modelling Practice and Theory 13, pp. 693-702.

Gorchetchnikov, A. 2017. An Approach to a Biologically Realistic Simulation of Natural Memory. Master's thesis, Middle Tennessee State University, Murfreesboro, TN, 70 pages.

Gorchetchnikov A., Versace M., Hasselmo M. E. (2005). A Model of STDP Based on Spatially and Temporally Local Information: Derivation and Combination with Gated Decay. Neural Networks, 18, pp. 458-466.

Gorchetchnikov A., Versace M., Hasselmo M. E. (2005). Spatially and temporally local spike-timing-dependent plasticity rule. In: Proceedings of the International Joint Conference on Neural Networks, No. 1568 in IEEE CD-ROM Catalog No. 05CH37662C, pp. 390-396.

Gorchetchnikov A., Hasselmo M. E. (2005). A simple rule for spike-timing-dependent plasticity: local influence of AHP current. Neurocomputing, 65-66, pp. 885-890.

Gorchetchnikov A., Hasselmo M. E. (2005). A biophysical implementation of a bidirectional graph search algorithm to solve multiple goal navigation tasks. Connection Science, 17(1-2), pp. 145-166.

(56) References Cited

OTHER PUBLICATIONS

Hagen, T. R., Hjelmervik, J., Lie, K.-A., Natvig, J., and Ofstad Henriksen, M. 2005. Visual simulation of shallow-water waves. Simulation Modelling Practice and Theory 13, pp. 716-726.
Hodgkin, A. L., and Huxley, A. F. 1952. Quantitative description of membrane current and its application to conduction and excitation in nerve. J Physiol 117, pp. 500-544.
Hopfield, J. 1982. Neural networks and physical systems with emergent collective computational abilities. In Proc Natl Acad Sci USA, vol. 79, pp. 2554-2558.
Ilie, A. 2002. Optical character recognition on graphics hardware. Tech. Rep. integrative paper, UNCCH, Department of Computer Science, 9 pages.
Kolb, A., L. Latta, and C. Rezk-Salama. 2004. "Hardware-Based Simulation and Collision Detection for Large Particle Systems." In Proceedings of the SIGGRAPH/Eurographics Workshop on Graphics Hardware 2004, pp. 123-131.
Kipfer, P., Segal, M., and Westermann, R. 2004. UberFlow: A GPU-Based Particle Engine. In Proceedings of the SIGGRAPH/Eurographics Workshop on Graphics Hardware 2004, pp. 115-122.
Meuth, J.R. and Wunsch, D.C. (2007) A Survey of Neural Computation on Graphics Processing Hardware. 22nd IEEE International Symposium on Intelligent Control, Part of IEEE Multi-conference on Systems and Control, Singapore, Oct. 1-3, 2007, 5 pages.
Oh, K.-S., and Jung, K. 2004. GPU implementation of neural networks. Pattern Recognition 37, pp. 1311-1314.
Rolfes, T. 2004. Artificial Neural Networks on Programmable Graphics Hardware. In Game Programming Gems 4, A. Kirmse, Ed. Charles River Media, Hingham, MA, pp. 373-378.
Ruesch, J. et al. 2008. Multimodal Saliency-Based Bottom-Up Attention a Framework for the Humanoid Robot iCub. 2008 IEEE International Conference on Robotics and Automation, pp. 962-965.
Rumpf, M. and Strzodka, R. Graphics processor units: New prospects for parallel computing. In Are Magnus Bruaset and Aslak Tveito, editors, Numerical Solution of Partial Differential Equations on Parallel Computers, vol. 51 of Lecture Notes in Computational Science and Engineering, pp. 89-134. Springer, 2005.
Sherbakov, L. et al. 2012. CogEye: from active vision to context identification, youtube, retrieved from the Internet on Oct. 10, 2017: URL://www.youtube.com/watch?v=i5PQk962B1k, 1 page.
Sherbakov, L. et al. 2013. CogEye: system diagram module brain area function algorithm approx # neurons, retrieved from the Internet on Oct. 12, 2017: URL://http://www-labsticc.univ-ubs.fr/~coussy/neucomp2013/index_fichiers/material/posters/NeuComp2013_final56x36.pdf, 1 page.
Non-Final Office Action dated Jan. 4, 2018 from U.S. Appl. No. 15/262,637, 23 pages.
Wu, Yan & J. Cai, H. (2010). A Simulation Study of Deep Belief Network Combined with the Self-Organizing Mechanism of Adaptive Resonance Theory. 10.1109/CISE.2010.5677265, 4 pages.
Al-Kaysi, A. M. et al., A Multichannel Deep Belief Network for the Classification of EEG Data, from Ontology-based Information Extraction for Residential Land Use Suitability: A Case Study of the City of Regina, Canada, DOI 10.1007/978-3-319-26561-2_5, 8 pages (Nov. 2015).
Apolloni, B. et al., Training a network of mobile neurons, Proceedings of International Joint Conference on Neural Networks, San Jose, CA, doi: 10.1109/IJCNN.2011.6033427, pp. 1683-1691 (Jul. 31-Aug. 5, 2011).
Boddapati, V., Classifying Environmental Sounds with Image Networks, Thesis, Faculty of Computing Blekinge Institute of Technology, 37 pages (Feb. 2017).
Khaligh-Razavi, S.-M. et al., Deep Supervised, but Not Unsupervised, Models May Explain IT Cortical Representation, PLoS Computational Biology, vol. 10, Issue 11, 29 pages (Nov. 2014).
Kim, S., Novel approaches to clustering, biclustering and algorithms based on adaptive resonance theory and intelligent control, Doctoral Dissertations, Missouri University of Science and Technology, 125 pages (2016).
Notice of Alllowance dated May 22, 2018 from U.S. Appl. No. 15/262,637, 6 pages.
Ren, Y. et al., Ensemble Classification and Regression—Recent Developments, Applications and Future Directions, in IEEE Computational Intelligence Magazine, 10.1109/MCI.2015.2471235, 14 pages (2016).
Sun, Z. et al., Recognition of SAR target based on multilayer auto-encoder and SNN, International Journal of Innovative Computing, Information and Control, vol. 9, No. 11, pp. 4331-4341, Nov. 2013.

\* cited by examiner

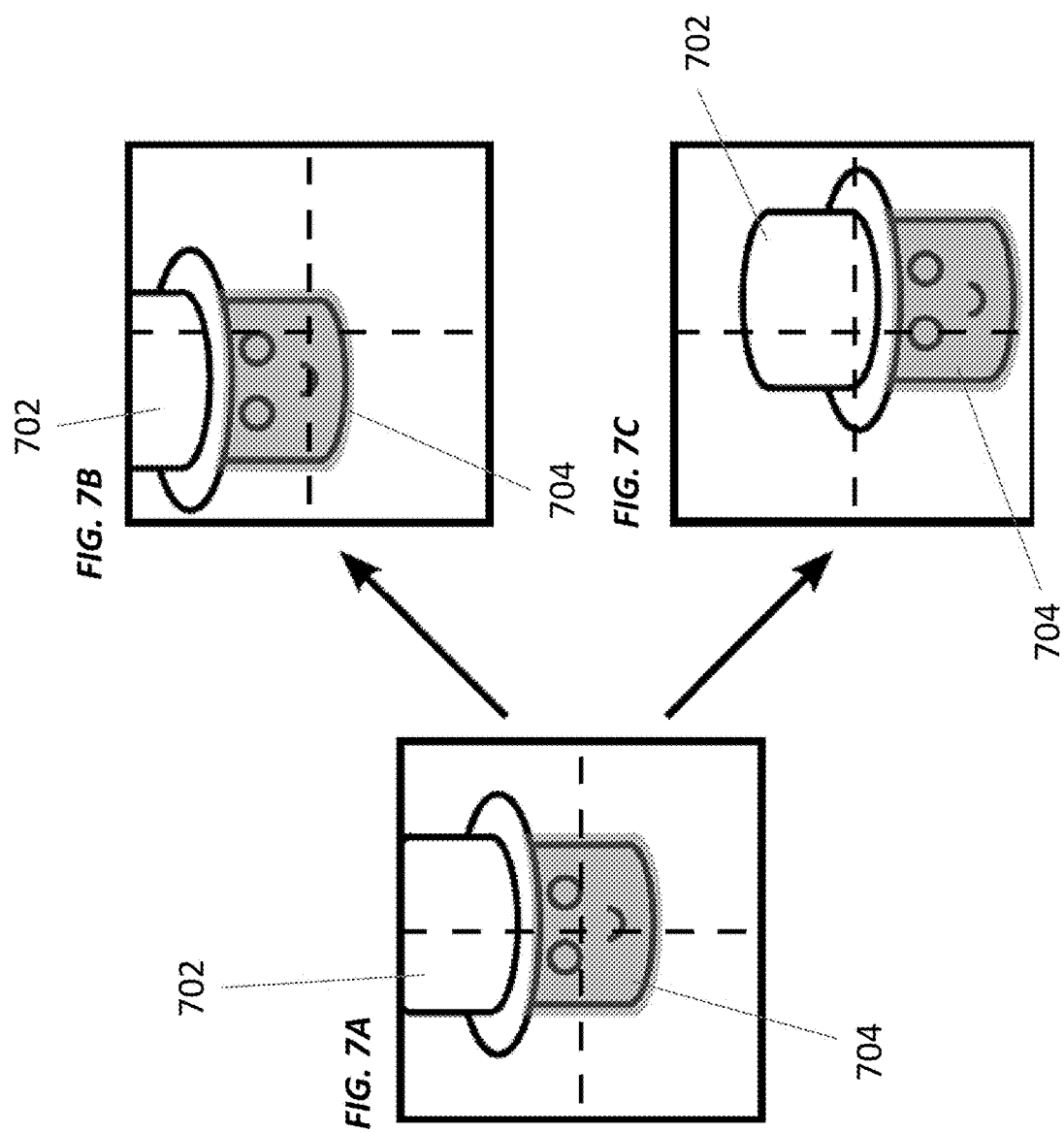

METHODS AND APPARATUS FOR AUTONOMOUS ROBOTIC CONTROL

CROSS-REFERENCE TO RELATED PATENT APPLICATION

This application is a continuation of U.S. application Ser. No. 14/662,657, filed Mar. 19, 2015, and entitled "Methods and Apparatus for Autonomous Robotic Control," which claims priority, under 35 U.S.C. § 119(e), from U.S. Application No. 61/955,756, filed Mar. 19, 2014, and entitled "Methods and Apparatus for Autonomous Robotic Control." Each of these applications is hereby incorporated herein by reference in its entirety.

GOVERNMENT SUPPORT

This invention was made with government support under Contract No. FA8750-12-C-0123 awarded by Air Force Research Laboratory (AFRL), under Contract No. NNX12CG32P awarded by NASA Phase I STTR, and under Contract No. NNX13CL63C awarded by NASA Phase II STTR. The government has certain rights in the invention.

BACKGROUND

For a mobile robot to operate autonomously, it should be able to locate obstacles and steer around them as it moves within its environment. For example, a mobile robot may acquire images of its environment, process them to identify and locate obstacles, then plot a path around the obstacles identified in the images. In some cases, a mobile robot may include multiple cameras, e.g., to acquire stereoscopic image data that can be used to estimate the range to certain items within its field of view. A mobile robot may also use other sensors, such as radar or lidar, to acquire additional data about its environment. Radar is particularly useful for peering through smoke or haze, and lidar returns can sometimes be used determine the composition of objects within the environment. A mobile robot may fuse lidar, radar, and/or other data with visible image data in order to more accurately identify and locate obstacles in its environment. To date, however, sensory processing of visual, auditory, and other sensor information (e.g., LIDAR, RADAR) is conventionally based on "stovepiped," or isolated processing, with little interaction between modules.

SUMMARY

Embodiments of the present invention include a system for identifying and locating objects in a robot's environment. Such a system may include an image sensor and processor operably coupled to the image sensor. In operation, the image sensor acquires a plurality of images of at least a portion of the environment surrounding the robot. The processor translates each image in the plurality of images from the image sensor's frame of reference to an allocentric frame of reference. The processor identifies a position, in the allocentric frame of reference, of an object appearing in at least one image in the plurality of images. And the processor determines if the object appears in at least one other image in the plurality of images based on the position, in the allocentric frame of reference, of the object.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 7A-7C show fitting a spatial shroud to an object in different images of the robot's environment.

DETAILED DESCRIPTION

Figure 1:
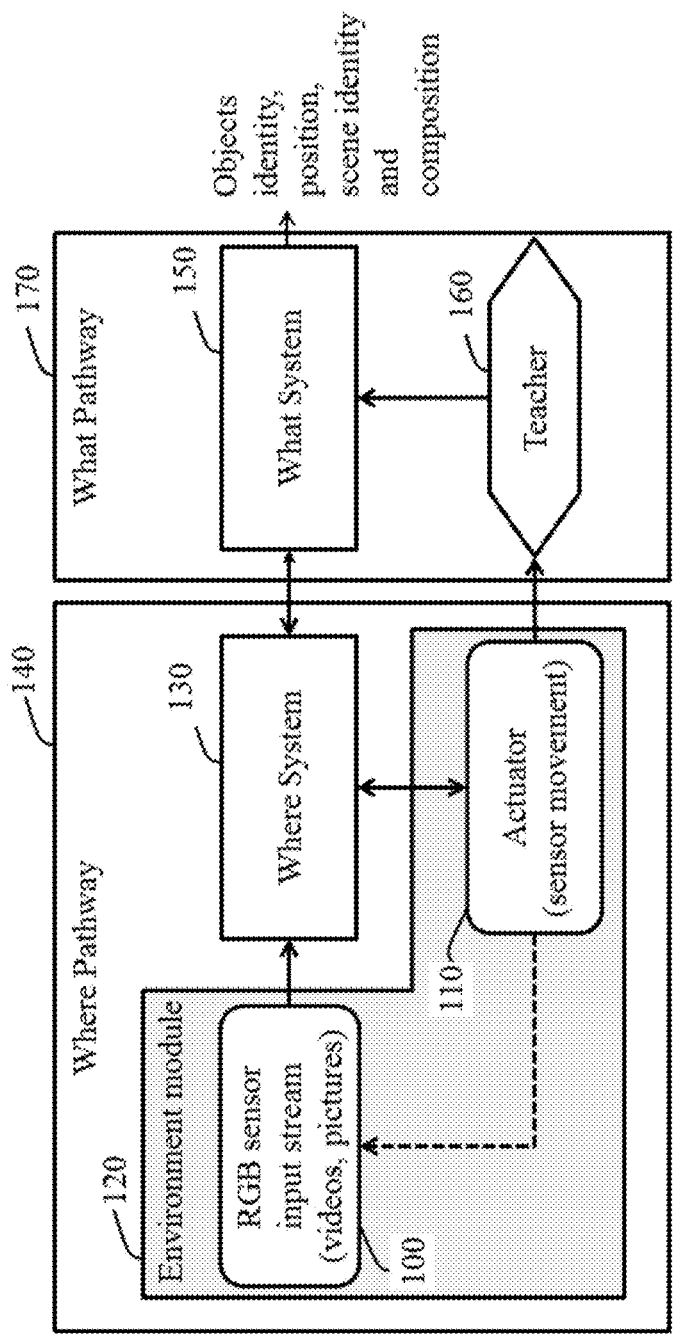
FIG. 1 is a block diagram of an example OpenEye system.

The methods described herein provide an exemplary unified technology for identifying, learning, localizing, and tracking objects based on camera (e.g., RGB) input. Some examples of this technology are called "OpenEye" and can be implemented as an artificial, active sensory system and a unified framework for processing sensor data, including but not limited to image data. OpenEye may be utilized in both artificial (e.g., simulated environments, such as an environment generated synthetically via a video-game engine) and natural environments (e.g., an environment experienced by an unmanned aerial, ground, or submersible vehicle).

In operation, OpenEye learns incrementally about its visual input, and identifies objects in the sensor field of view and categorizes those objects by identity and position. OpenEye can operate with or without supervision, and does not require a manual labeling of object of interest to learn object identity. OpenEye can also accept user input to verbally label objects.

OpenEye simulates mammalian brains' dorsal (where—controlling where to look) and ventral (what—controlling the content of the image) pathways by using simulated eye movements (in virtual or real cameras) to learn identity of objects in complex images (see, e.g., Mishkin and Ungerleider 1982 and Webster et al., 1994).

In some implementations OpenEye uses a space-variant, log-polar representation of the input visual field to sample the image "view" generated by each eye movement. The log-polar representation provides some invariance to translation/rotation, and substantial savings in processing time with better scalability to large datasets by employing non-uniform input sampling and rapid scan of image segments, as opposed to processing the whole image at uniform resolution (Traver and Bernardino, 2010). The model uses the what-to-where feedback to sample the image intelligently. OpenEye does so by using the knowledge of the identity of the current object and its context to focus on spatial locations that yield greatest disambiguation of competing object identity (e.g., areas of an image that are more unique to an object). OpenEye may be validated on natural and synthetic images, as well as on the standard MNIST handwritten digit dataset.

As opposed to other approaches (e.g., neural networks), the OpenEye system may not rely on extensive training (batch training) to be able to classify correctly objects in the data stream, and can learn new knowledge online (i.e., during performance) without corrupting or forgetting previously learned knowledge. Additionally, the system is able to autonomously search for information in an image via an active visual search process, which mimics the mechanism used by mammals to rapidly and efficiently scan their visual world for important information. OpenEye memory system is designed to allow on-line optimization of synaptic memories. Additionally, OpenEye can mimic human eye movements by reproducing human fixation patterns with or without a training session where OpenEye learns the fixation location of a human user via eye-tracker.

Neurally Inspired Robot Perception, Object Identification, and Object Location

A conventional robot does not perceive its environment like a human. For example, a robot may "see" its environment by acquiring imagery of some or all or its environment at a uniform resolution. It then processes the imagery by dividing the imagery into a grid of pixels and examining each pixel in the grid. This process can take too much time and too much energy to be useful for identifying objects moving relative to the robot, especially if the robot is moving at relatively high velocity (e.g., a drone flying at low altitude). In addition, the robot may spend an inordinate amount of time processing empty or irrelevant pixels.

A human does not process the detail of entire images on a pixel-by-pixel basis. Instead, the human eye acquires imagery of non-uniform resolution: the central part of the retina, or fovea, which is densely packed with light-sensitive cones, acquires the central part of each image at relatively fine resolution. And the peripheral portion of the retina, which is covered at lower density with light-sensitive rods and cones, acquires the peripheral portion of each image at coarser resolution. The resulting "foveated imagery" has resolution that varies spatially across each image, with the finest resolution at a fixation point and coarser resolution elsewhere. This notion of obtaining imagery at a resolution that varies spatially across each image is referred to herein as "foveation."

To account for the spatial variation in image resolution, a human moves his or her eyes rapidly among different points in his or her field of view. For instance, a human may fixate on points at or near an interesting portion of a scene, such as a face, for relatively long periods, and fixate on points at or near less interesting portions of the scene, such as a tree, for shorter periods, if at all. These quick, simultaneous movements to different fixation points, or saccades, allow a human to identify and locate items of interest without spending time or energy examining interesting portions of the scene.

Similarly, the OpenEye technology disclosed herein allows a robot to identify and locate objects in its environment using "foveated" data collection and "saccade" style imaging as explained below with respect to FIGS. 1-4. For instance, one or more processors may control collection and processing of visual imagery according to a neural model inspired by the human brain. A camera or other sensor acquires imagery of the robot's environment and passes this imagery to a graphics processing unit (GPU) or other suitable processor, which locates and identifies one or more objects in the imagery (e.g., using the What and Where pathways described in greater detail below) based on the imagery itself and information about the sensor's orientation, position, and/or field of view. In some cases, the GPU may translate the imagery among different frames of reference, including camera-centered, robot-based egocentric, and allocentric frames of reference, to make processing more efficient and/or more precise.

The processor also determines the next fixation point of the sensor system based on the location and/or identity of the object(s). In some cases, it transmits movement vector representing the saccade between the current fixation point and the next fixation point to an actuator that then actuates the sensor appropriately. For instance, the processor may cause a pan-tilt actuator to move a camera mounted on the robot so as to acquire imagery of an object from different angles and/or positions. The robot itself may move to change the sensor's field of view. In other cases, the processor may cause synthetic "saccades," e.g., by processing different portions of the same image or different portions of different images at different resolutions depending on the objects and their locations. The robot may also use object information and sensor position and orientation data to inhibit the sensor from fixating repeatedly on the same object or the same portion of the scene.

Because the technology disclosed herein mimics human neural processing, it can process imagery and other sensory data more efficiently and identify objects in the robot's environment more quickly. This is especially useful for robots in hazardous applications, such as planetary exploration, where processing and battery efficiency are critical, and for robots that collect large volumes of data, such surveillance drones, where efficient sense-making is key to interpreting large amounts of real-time data. It also has general application to all types of vision systems, including simulations, such as those used in video games, flight simulators, etc.

Visual Stream Exploration and Visual Object Learning

The OpenEye model proposes a method for combining visual stream exploration and visual object learning. Each is considered below.

Visual Stream Exploration Models

The computational model proposed by Itti and Koch (2001) simulates an aspect of human vision that predicts the probability that a certain image area will attract an observer's attention and eye movements. The model only includes bottom-up, or sensory features, while OpenEye also accounts for cognitive (top-down) biases on eye movements. Additionally, the model does not include learning, object, or scene recognition, which are instead incorporated in OpenEye, where they bias image stream exploration as discussed below.

OpenEye also differs from Riesenhuber and Poggio's (1999) neural model, which employs a spatially homogenous representation of the image vs. OpenEye's spatially variant representation and use of sensor movement. Both the Itti & Koch (2001) and Riesenhuber & Poggio (1999)

models postulate that visual objects need to be identified in one glance. OpenEye, instead, accounts for the potential need to explore the input sensory image to gather additional evidence for recognition, which is particularly useful for ambiguous objects/scenes (e.g., occluded objects).

Visual Object Learning Models

In terms of learning, OpenEye may use two interchangeable learning methodologies. The first method is based on the Baraldi and Alpaydin (1998, 2002) and Baraldi and Parmiggiani (1997) learning models, which provide the following benefits. The second method is based on a recurrent adaptive architecture. Both methodologies simultaneously implement fast and slow learning.

Usually, fast learning (e.g., Carpenter and Grossberg, 1987) systems underperform slow-learning ones (Rumelhart et al., 1986), but the former are much more useful in engineered system such as robots or sensors operating in real-time in a rapidly changing environment. After only single instance of presentation of each item, humans and other animals can learn to recognize pictures, words, names, and faces, and recording at a local cellular level confirms that neurons can change to reflect such fast learning (Bunzeck & Düzel, 2006; Rutishauser et al., 2006). To date, no artificial system has been engineered to achieve this goal in a machine.

Several object recognition algorithms have been developed over the last few decades (for reviews, see Besl and Jain, 1985; Logothetis and Sheinberg, 1996; Riesenhuber and Poggio, 2000; Bengio et al., 2012). In general, a commonality between these algorithms is the focus on finding the appropriate representation for the data, where the difference among algorithms performance is due to the nature of the features/input data transformations. For instance, convolutional network models (Ranzato et al., 2007; Jarrett et al. 2009; LeCun et al., 2010) and restricted Boltzmann machines (Smolensky, 1986; Salakhutdinov and Hinton, 2009) are among the best object recognition algorithms. Both classes of algorithms perform three main steps:
a) feature extraction. This can be either hardwired, random, or learned;
b) non-linear transformation on the resulting filtered data; and
c) A pooling step on the result of step b). The connectivity between stages and the number of filter-transform-pool stages can vary.

Deep learning networks include networks where there are several layers of stacked filter-transform-pool, e.g. in the HMAX model (Riesenhuber & Poggio, 1999) and deep belief networks (Hinton et al., 2006).

Similarly, Spratling (2008, 2009, 2012) has introduced several recognition systems built of stackable "cortical" modules. These models are composed of modules that work hierarchically and perform a process called "predictive coding", that looks very akin to matching in an ART system. A close examination of the derivation of the learning laws in these systems (Spratling et al., 2009) reveals that they were developed as an incremental version of a well-known batch coding algorithm, non-negative matrix factorization (NMF), developed by Lee and Seung (1997, 1999). The algorithm presented by Spratling at al. does allow incremental (fast) learning, but does not include methods for object segregation/segmentation, scene recognition, and active vision.

However, none of the above-mentioned object recognition algorithms deals with the issues of how objects are separated from their background, and neither of those models uses space-variant sampling.

The ARTScan (Fazl et al., 2009) model, the saccading restricted Boltzmann machine (sRBM) (Larochelle & Hinton, 2012), and the entropy minimization algorithm of saccades (Friston et al., 2012)

The saccading restricted Boltzmann machine (Larochelle and Hinton, 2012) uses space variant vision. However, it does not include a mechanism that informs the system when the system stops fixation from an object and starts fixating on another, which is provided by a human supervisor. The system could not tell apart two identical objects presented side-by-side with a spatial gap separating them.

The entropy minimization algorithm of saccades (Friston et al., 2012) includes bi-directional What-to-Where stream interactions but does not use space-variant vision, and it suffers from the same issue as Larochelle and Hinton (2012) in terms of object fixation memory.

The ARTScan (Fazl et al., 2009) model includes Where-to-What interaction in guiding when the What system should learn/stop learning, but does not include What-to-Where interactions to inform eye movement and visual search. Additionally, OpenEye differs from ARTScan in these additional dimensions:

OpenEye and ARTScan use a different log-polar sampling;
OpenEye shroud formation is feed-forward;
OpenEye is designed to operate in 3D environments in a noisy background;
OpenEye is designed to handle self-motion;
OpenEye employs a concept of temporal continuity to support dynamic scenes;
OpenEye can combine multiple saliencies, endogenous spatial attention, attention to specific features in order to make next saccade; and
While ARTScan used handcrafted images OpenEye can be used with arbitrary image data, such as the standard MNIST database;

Object learning models from Baloch and Waxman (1991), Bradski and Grossberg, (1995), Seibert and Waxman (1992) do use space-variant transformation, or "cortical magnification", but only focus statically at an object's center-of-mass.

OpenEye methods discussed in Sections 4 employ a learning scheme that maximizes memory efficiency in terms of learning accuracy and capacity to enable both fast and slow stable learning of sensory features.

Benefits and Applications

Benefits of these methods and systems include providing a single process for identifying, learning, localizing, and tracking objects in visual scenes provided by cameras. Exemplary methods allow quick and stable learning of new patterns without the need to retrain the system, while reducing network (system) size and communication between system components with respect to competing models. The method allows continuous learning of arbitrary sensory representations in hierarchies of rate-based or spike-based neural processing stages connected by adaptive (learnable) synaptic weights. An additional benefit of this method is to allow fast learning of new stimuli without the need to interrupt the functioning of the machine, e.g., allowing a robot with a camera to quickly learn the identity of a new, previously unlearned input without the need to retrain previously seen input.

The novel method presented herein can have application in designing software to either extract information or control mobile robots or cameras. In particular, the method allows these machines to increase their knowledge base over time without the need to retrain the system on the entire knowledge base.

OpenEye Overview

OpenEye is an artificial visual system operating on visual data. The OpenEye model is comprised of four main modules: the Environment Module, the Where system, the What system, and an external module that can provide a teaching signal to the what system (FIG. 1). These four components will be discussed in detail below.

The Environment Module (100) abstracts interactions between the vision system and the environment, which can be a virtual environment or a real environment sampled by a fix/pan-tilt camera, a robot-mounted camera, or other visual (or non-visual) sensory system. This module delivers a visual image to the visual system and executes camera movement commands, which emulate human eye movements. The environment module allows OpenEye to interact with the environment: virtual or real, static or dynamic, real time or prerecorded.

One task of the Where System (130) is to decide where the sensory system should look based on salient image properties extracted from the visual image, or based on information coming from the What System pertaining to the identity of objects in the environments, and/or the scene identity as a whole. Processing of a visual image by the where system module includes aspects of the mammalian lateral geniculate nucleus (LGN), primary visual cortex (V1), and higher cortices (V2, MT, MST) processing. The image obtained from the environment module in retinal coordinates undergoes a log-polar transformation to simulate space-variant sampling of the visual input and extraction of features such as (but not limited to) edge, contour, color, and luminance. OpenEye's functioning is not limited to log-polar sampling, and can operate with other space-variant transformations, such as the reciprocal-wedge transform (Tong and Li, 1995), or the pyramid method (Adelson et. Al, 1984), as examples.

Also known as the dorsal stream in vision literature (Mishkin and Ungerleider 1982; Webster et al., 1994), OpenEye's Where System generates camera movements in order sample an image by foveation on the spatial location it selects as the most salient, where saliency can be determined by sensory input or semantic (What System) information. Foveation is achieved by centering the sensor in the object of interest, so that the object is likely to fall in the center of the space-variant representation. A form-fitting attentional shroud (namely a signal that fits the form, or shape, of an object, similarly to the way a shroud or veil fits the surface it rests on) is then formed around the foveated object. The shroud serves to suppress surrounding objects in order to isolate the object of interest for learning in the What System, and enables the system to trigger further camera movements centered exclusively on this enshrouded object. The ability of the Where System to form this attentional shroud around a single object has the added benefit of detecting when a foveation has left the previous object of interest. This change in foveated object produces a reset signal that represents temporal discontinuity between the foveations and is used by the What System to regulate learning, with the result of allowing OpenEye to group multiple views of an object (but not other objects, or the background) into coherent object categories. Another function of the Where System is to maintain a visual working memory of previously foveated locations such that the camera does not persistently choose the same point of fixation. Together with the Environment Module, the Where System forms the Where Pathway (140) that concerns with spatial interaction with the environment and spatial processing.

The What System (150) includes a hierarchy of classifiers that collectively learn to visually recognize an arbitrary number of objects regardless of each object's position and orientation relative to the sensor(s), e.g. a camera. The What System receives an object's feature representation as input from the Where System. Views are then clustered in an incremental, unsupervised fashion into object representations based either on their similarity or according to their temporal continuity as signaled by the Where System. The Where System provides a shroud-based reset signal, discussed later, that informs the What System when seemingly different views are part of the same or different object; this signal is important to OpenEye's ability to learn pose-invariant object representations (Fazl et al., 2009). An optional external Teacher (160) provides a supervised learning environment that not only improves classification accuracy and learning speed but also dynamically creates a user-friendly search interface to the visual system's learned knowledge. Because of the hierarchical separation of unsupervised view learning and supervised object-label learning, the What System can be switched between unsupervised and supervised learning modes at any time.

The What system and Teacher together form the What Pathway (170), modeled upon the ventral visual processing stream in the mammalian brain, which concerns the identity of those objects viewed by OpenEye. FIG. 1 depicts the overall structure of OpenEye. Each module is described below with its corresponding block number.

Encoding OpenEye Activity

A critical task for OpenEye operation is switching between the coordinate systems centered on the on the robot/camera/sensor (ego-centric), the environment (image-centric or world-centric), and between metrics systems (e.g., Cartesian or log-polar). For example, the image is sampled using retinal (log-polar) metric, or other (e.g., pyramid or reciprocal-wedge), but the signal for the cameral to move and how much to adjust the pitch, yaw is provided in Cartesian (linear) metric. One role of the Where System concerns translating between representations of a signal to different coordinate bases. For clarity, each coordinate system is defined with a term that refers to where the system is centered followed by a term that defines the distance metric of the reference frame. Reference frames can be centered at three possible locations: 1) sensor-centered, 2) ego-centered, and 3) image-centered. Sensor-centered refers to a coordinate system where the (0, 0) location resides at the position of the current camera center. Ego-centered refers to a coordinate system where (0, 0) corresponds to a neutral position of a sensor, with respect which the camera center may be shifted or rotated. This robot-centered coordinate system can interface with other software systems to provide object location data relative to the physical system or, when paired with global navigation data, to provide a global object location. Image-centered refers to a reference frame in which the (0, 0) location is at the image center. Image-centered can also be interpreted as global coordinates or scene-centered when the scene is dynamically changing. Correspondingly there are at least three set of dimensions used in OpenEye: Image Dimensions [$W_i$ $H_i$], Sensor Movement Range [$W_e$ $H_e$], and Sensor Dimensions [$W_s$ $H_s$] that represent log-polar transform of the Sensor Movement Range. This notation is used in OpenEye description below.

There are at least two distance metrics in the coordinate frames: 1) log-polar, and 2) Cartesian. The log-polar distance metric reflects how the eye naturally samples the image and image representation in primary visual cortex, and is employed in the described system by performing a space-variant (log-polar in this case, but other methods could be used) transformation to the ray input, while the Cartesian distance metric is more pertinent when mapping representations onto the real word or for invoking linear control of the eye/camera. In the figures and text below, coordinate frame are referred to as a combination of where it is centered and what defines its distance.

Figure 2:
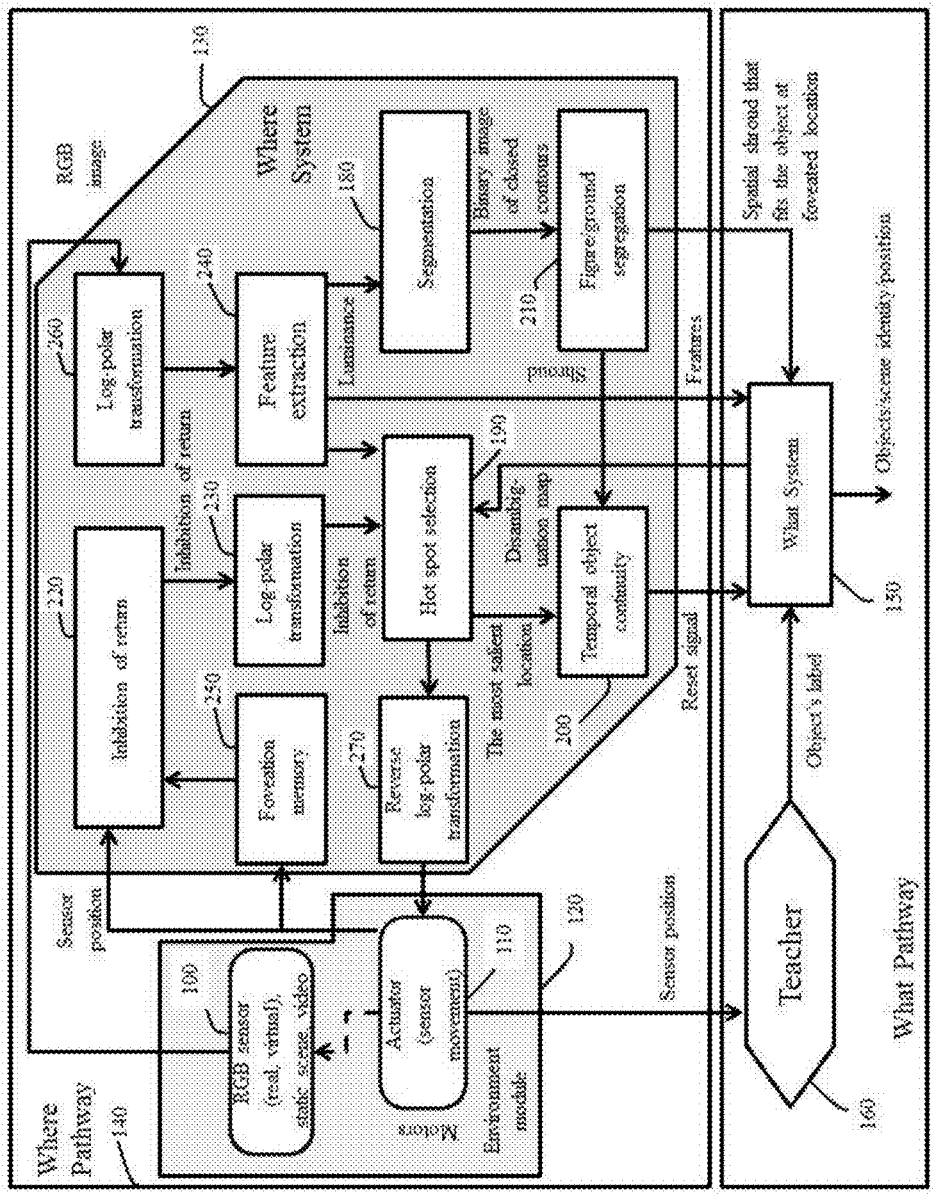
FIG. 2 is a block diagram of the Where Pathway module shown in FIG. 2.
Figure 3:
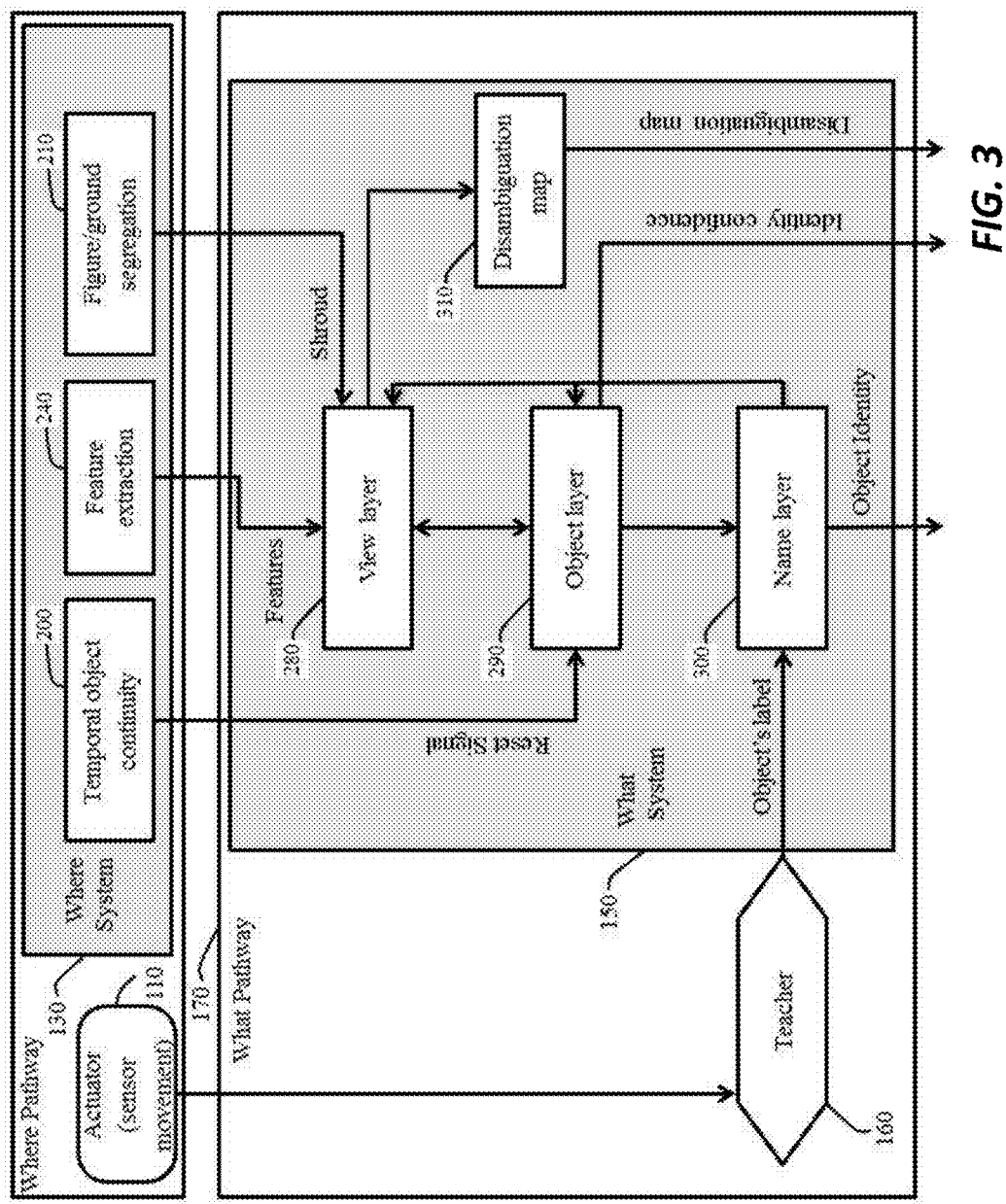
FIG. 3 is a block diagram of the What Pathway module shown in FIG. 2.

FIGS. 1-3 depicts aspects of the What and Where systems of an example OpenEye system. FIG. 1 shows the Environment Module (120) and the Where System (130), which collectively constitute the Where Pathway (140). The environment module 120 includes an RGB image sensor 100, which may acquire still and/or video images, whose field of view can be shifted, narrowed, and/or expanded with one or more actuators 110, including but not limited to zoom lenses, tip/tilt stages, translation stages, etc. The environment module 120 provides both image data from the image sensor 100 and actuation data (sensor position data) from the actuator(s) 110 to the Where system 130, which in turn provides processed image data to the What system 150. The environment module 120 also provides actuation data (sensor position data) from the actuator(s) 110 to the Teacher 160, which forms part of the What pathway 170 with the What system 150.

FIG. 2 shows the Where system 130 in greater detail. A first log-polar transformation block 260 in the Where system 130 performs a log-polar transformation on the image data from the image sensor 100 as described in greater detail below. A feature extraction block 240 identifies features in the transformed image data, which is segmented into bounded regions by a segmentation block 180. A figure/segregation block 210 segregates the bounded regions to form a spatial shroud that fits the foveated region of the image. The figure/segregation block 210 provides a representation of this spatial shroud to the What system 150.

FIG. 2 also shows that the actuator(s) 100 provide sensor position data to a foveation memory 250 and an inhibition of return block 220, which together prevent the image sensor from foveating the same portions of the scene (acquiring and/or processing imagery of the same portions of the scene, e.g., at enhanced resolution) unnecessarily. A second log-polar transformation block 230 performs a log-polar transformation on the output of the inhibition of return block and passes the transformed output to a hot spot selection block 190, which determines the next portion of the scene for foveation. A reverse log-polar transformation block 270 transforms the output vector into the frame of reference used by the actuator(s) 100 and provides the transformed output vector to the actuator(s) 100 for actuation of the sensor 100. A temporal object continuity block 200 processes another copy of the hot spot selection block output to determine if the next foveation location falls off the current object surface. If so, the temporal object continuity block 200 transmits a "reset" signal to the What system 150

FIG. 3 shows the What system 150 in greater detail. The What system 150 uses data from the temporal object continuity block 200, the feature extraction block 240, and the figure/ground segregation block 210 to identify and locate objects in the scene imaged by the image sensor 100. A view layer 280 uses features and shroud data from the Where system 130 to cluster shroud-gated visual representations of object views according to their feature similarity. A disambiguation map block 310 generates a disambiguation map of the scene based on these representations from the view layer 280.

The object layer 290 uses the representations from the view layer 280 to learn pose-invariant object representations by associating different view prototypes from the view layer 280 according to their temporal continuity provided by the reset signal from the Where system 130. This yields an identity confidence measure, which can be fed into a name layer 300 that groups different objects under the same user label, which may be obtained from an optional teacher 160. The optional teacher 160 shapes the association between objects and their labels and feeds this information from the Name layer 300 to the Object layer 290 and View layer 280 to the speed and accuracy of future object learning.

The What system and the Where system can be implemented in hardware, firmware, software, or a suitable combination thereof. For example, the What and Where systems may be implemented as processor-implementable instructions that are stored in non-transient form in one or more memories located in or on a robot, such as a unmanned aerial, ground, or submersible vehicle. Some or all of the processor-implementable instructions may also be stored on remote memory, such memory in or accessible by a server that communicates with the robot via a wireless communication link (e.g., a radio-frequency or optical link).

The robot may include one or more processors that are coupled to the memory and configured to execute the instructions so as to implement the What and Where systems, including the individual modules shown in FIGS. 1-4. For example, the robot may execute the instructions with a central processing unit (CPU) and a graphics processing unit (GPU), e.g., as disclosed in U.S. Pat. No. 8,648,867, which is incorporated herein by reference in its entirety. The processor(s) can also be implemented as application specific integrated circuits (ASICs), field-programmable gate arrays (FPGAs), and/or other device or component as understood in the art.

In some embodiments, some or all of the processors may be located remotely—that is, not on or in the robot. For example, the processors (include GPUs) may be located in one or more smart phones, tablets, and/or single board computers (SBCs). The processors may also form part or all of a cluster computing environment, with each processor in the cluster dedicated to particular task or group of tasks. In these embodiments, the processors may communicate with sensors, actuators, and other devices and components on or in the robot via a suitable communications link, such as a radio-frequency or optical communications link.

Figure 5:
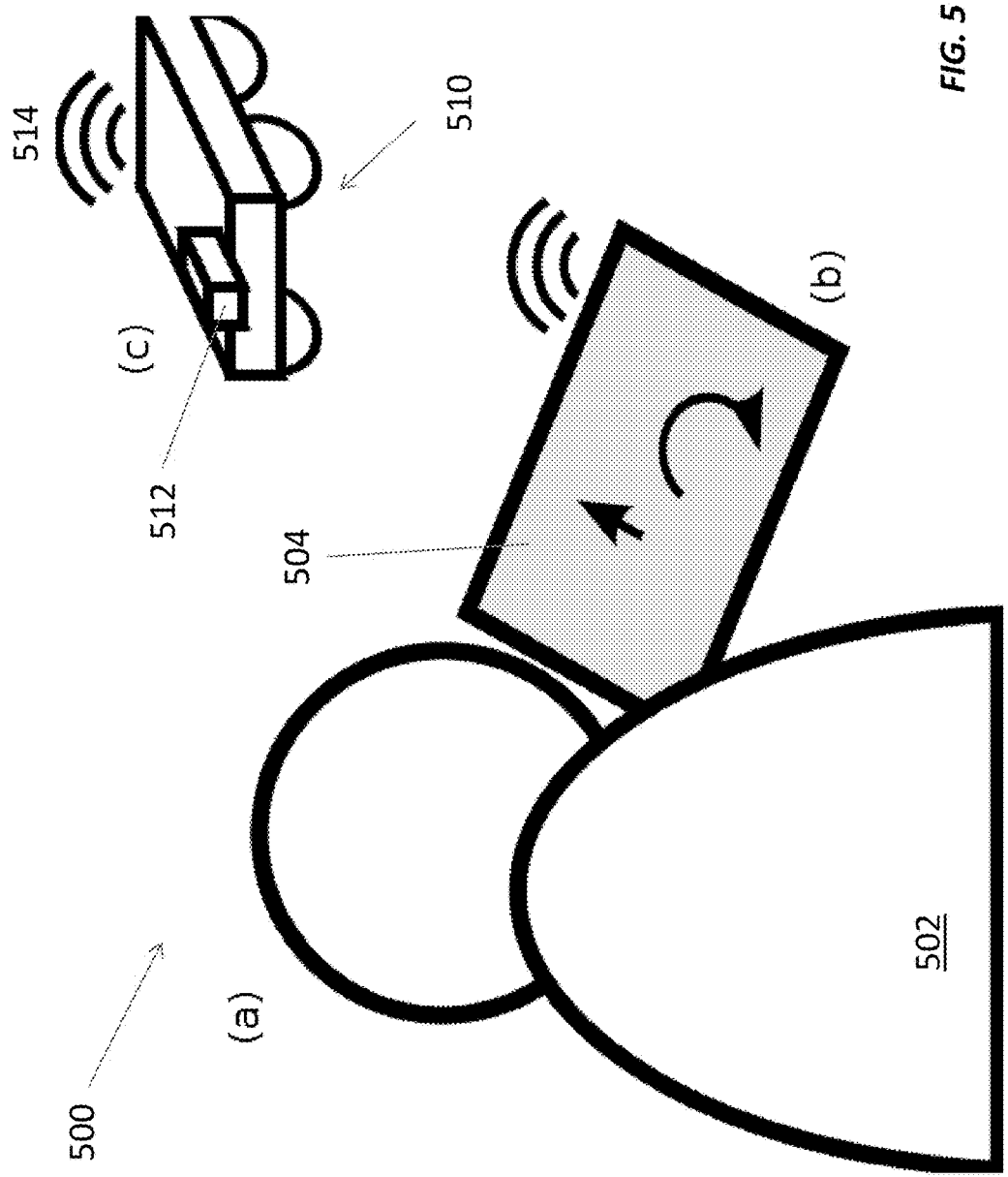
FIG. 5 illustrates control of a robot using the OpenEye system via a remote controller, such as a tablet or smartphone.

FIG. 5 illustrates an OpenEye system 500 used to control a wheeled robot 510. The OpenEye system 500 includes a computing device 504, such as a tablet computer or other electronic device with wireless capabilities, that is controlled by a user 502. The computing device 504 communicates with the robot 510, which includes an image sensor 512 and an antenna 514, via a wireless link. The user 502 issues commands to the robot 510 via software running on the computing device 504, a processor (not shown) on the robot 510, and/or on other cloud-based processors (not shown).

In operation, the image sensor 512 can be oriented and/or positioned either by the user when manually operating the robot or automatically by the software. For example, the image sensor 512 may be mounted on a pan/tilt stage, translation stage, or rotation stage that can be actuated to change the image sensor's orientation and/or position. The image sensor 512 may also have a (motorized) zoom lens that can be used to zoom in or out on certain portions of the environment. In addition, or instead, the image sensor 512 can be oriented or positioned as desired by moving the robot 510. In some cases, the image sensor 512 may static with respect to the robot 510; this is roughly equivalent to somebody without, say, neck and eye muscles. In order to change the static image sensor's point of view, the body of the robot rotates and/or moves, e.g., using wheels or legs for ground robots, propellers for drones, thrusters for submersible robots, etc.

Environment Module (120)

This Environment Module abstracts away the source of visual imagery (cameras, real or virtual, or other sensors, e.g. LIDAR) and applies sensor movement commands in the manner consistent with the environment in which OpenEye currently operates. OpenEye supports the following environments:

Static Scenes—JPEG, PNG images, etc.

Dynamic Scenes—movie files (.avi, .mp4, etc.)

Camera—Real 3d visual world

Virtual Camera—virtual environment, based on the JMonkey game engine

Concrete implementations of this module are specific to the environment, but the input and the output should comply with the specification below.

RGB Sensor (100)

RGB delivers the RGB image sampled from the environment as directed by the RGB Sensor Actuator. The later simulates eye movement by moving the camera.

Input:

| Name | Data Type | Data Dimensions | Element Type | Element Dimensions | Metric | Base |
|---|---|---|---|---|---|---|
| Sensor (e.g., camera) Position* | Vector | 0 | Unsigned, Byte | 2 | Cartesian | Ego-centered |

*This input does not have to be used in all environments. If the environment includes Sensor Movement Actuator (for example, P&T camera, or Virtual Camera), this input is not necessarily used by the RGB Sensor.

Output:

| Name | Data Type | Data Dimensions | Element Type | Element Dimensions | Metric | Base |
|---|---|---|---|---|---|---|
| RGB Sensor | Vector Field | $[W_s, H_s]$ | Unsigned, Byte | 3 | Cartesian | Sensor-centered |

Sensor Movement Actuator (110)

Sensor Movement Actuator implements sensor (e.g., camera) movement commands if they are supported by the environment, otherwise this module returns eye position in ego-centric coordinates.

Input:

| Name | Data Type | Data Dimensions | Element Type | Element Dimensions | Metric | Base |
|---|---|---|---|---|---|---|
| Sensor (Eye) Position | Vector | 0 | Unsigned, Byte | 2 | Cartesian | Ego-centered |
| Location to foveate | Vector | 0 | Unsigned, Byte | 2 | Cartesian | Sensor-centered |

Output:

| Name | Data Type | Data Dimensions | Element Type | Element Dimensions | Metric | Base |
|---|---|---|---|---|---|---|
| Sensor (Eye) Position | Vector | 0 | Unsigned, Byte | 2 | Cartesian | Ego-centered |

Where System (130)

One function of the Where System is to produce a foveated view of the object to be interpreted by the What System, to select the next location to foveate based on sensory and internal semantic information, and to determine and track the position of objects in the visual field and return their coordinates. The diagram of the Where System is presented on FIG. 2. All modules part of the Where System are enclosed in the module described in (130). The Where System receives the video image from the environment module and produces camera movement commands to be executed by the environment module (120). The Where System supplies the What System with the view of the object it currently looks at and the Reset signal, which marks the beginning of the object foveation sequence. The detailed description of the Where System modules is presented below.

Log-Polar Transformations

Several modules (230, 260, 270) perform transformation between log-polar and Cartesian encoding of the distance metric. OpenEye adheres to a bio-inspired log-polar transform of the input image, but the model can be used with different transform. The log-polar transform is applied to the RGB sensor subtending 136 degrees of visual angle, close to that reported in humans and other animals (Traver and Bernardino, 2010). The log-polar metric in space encoding is used across both OpenEye Where and What Systems and transformed back to the Cartesian metric by (230) to reference the external world beyond the current view, which is required by the Environment Module (120), the Foveation Memory module (250), and the Inhibition of Return module (220) in the Where Pathway. All Log-polar transformation modules share the parameters that specify dimensions of log-polar $[w_s, h_s]$ and Cartesian image $[W_s, H_s]$.

Log-Polar Transformation of Retinal RGB Image (260)

The image sampled at the foveated location undergoes log-polar transformation that amounts to space-variant sampling with higher resolution in the foveal area and much coarser resolution that falls with eccentricity outside the foveal region (Traver and Bernardino, 2010). This provides some invariance to translation/rotation and to save computational bandwidth while at the same time to acquire details at the location of the image that present the highest interest and is the most effective for the image representation.

Input:

| Name | Data Type | Data Dimensions | Element Type | Element Dimensions | Metric | Base |
|---|---|---|---|---|---|---|
| RGB Image I | Vector Field | $[W_s, H_s]$ | Unsigned, Byte | 3 | Cartesian | Sensor-centered |

Output:

| Name | Data Type | Data Dimensions | Element Type | Element Dimensions | Metric | Base |
|---|---|---|---|---|---|---|
| Log-Polar RGB Image O | Vector Field | [$w_s$, $h_s$] | Unsigned, Byte | 3 | Cartesian | Sensor-centered |

Processing:

$$O_{ij} = \begin{cases} I_{ij} d(i,j) < r_{fov} d(i,j) = \sqrt{(i-i_0)^2 + (j-j_0)^2} \\ I_{xy} d(i,j) \geq r_{fov} d(x,y) = \ln d(i,j) \end{cases} ;$$

Where:

$$r_{fov} = \frac{\max(W_S, W_h)}{24}; i_0 = \frac{(W_h - 1)}{2}; j_0 = \frac{(W_S - 1)}{2}.$$

Log-Polar Transformation of Inhibition of Return (230)

Similarly to retinal image, inhibition of return undergoes log-polar transformation in order to prevent the HotSpot Selection Module (190) from repeated foveations.

Input:

| Name | Data Type | Data Dimensions | Element Type | Element Dimensions | Metric | Base |
|---|---|---|---|---|---|---|
| Inhibition of Return I | Scalar Field | [$W_s$, $H_s$] | Unsigned, Byte | 0 | Cartesian | Sensor-centered |

Output:

| Name | Data Type | Data Dimensions | Element Type | Element Dimensions | Metric | Base |
|---|---|---|---|---|---|---|
| Log-Polar inhibition of return O | Scalar Field | [$w_s$, $h_s$] | Unsigned, Byte | 0 | Cartesian | Sensor-centered |

Processing:

$$O_{ij} = \begin{cases} \text{sign} I_{ij} d(i,j) < r_{fov} d(i,j) = \sqrt{(i-i_0)^2 + (j-j_0)^2} \\ \text{sign} I_{xy} d(i,j) \geq r_{fov} d(x,y) = \ln d(i,j) \end{cases} ;$$

Where:

$$r_{fov} = \frac{\max(W_S, W_h)}{24}; i_0 = \frac{(W_h - 1)}{2}; j = \frac{(W_S - 1)}{2}.$$

Reverse Log-Polar Transformation of Inhibition of Return (270)

HotSpot selected in the Log-polar view in sensor-centered coordinates (190) needs to be transformed back to Cartesian metric by (230) before it can be converted into sensor movement command by the Environment Sensor Movement Actuator (110). Input:

| Name | Data Type | Data Dimensions | Element Type | Element Dimensions | Metric | Base |
|---|---|---|---|---|---|---|
| Hot Spot I = [i j] | Vector | 0 | Unsigned, Byte | 2 | Log-polar | Sensor-centered |

Output:

| Name | Data Type | Data Dimensions | Element Type | Element Dimensions | Metric | Base |
|---|---|---|---|---|---|---|
| Hot Spot O = [x y] | vector | 0 | Unsigned, Byte | 2 | Cartesian | Sensor-centered |

Processing:

$$O = \begin{cases} [ij] d(i,j) < r_{fov} d(i,j) = \sqrt{(i-i_0)^2 + (j-j_0)^2} \\ [xy] d(i,j) \geq r_{fov} d(i,j) = \ln d(x,y) \end{cases} ;$$

Where:

$$r_{fov} = \frac{\max(W_S, W_h)}{24}; i_0 = \frac{H_S - 1}{2}; j_0 = \frac{W_S - 1}{2}.$$

Feature Extraction (240)

Feature Extraction (240) includes, but is not limited to, computation of luminance and color. Other features could include motion, or SIFT features (Lowe, 2004). "Features" can be:

1. A property of an image that can be associated with each image location;
2. A scalar (luminance, 0-dimensions) or vector (color, 1 dimension);
3. A numerical (integer, or real, e.g. luminance, color) or binary (Boolean, e.g., is an edge associated with this particular pixel) value. More abstract properties (e.g., "edgeness") can also be represented by a numerical feature—strength of the edge.

The description below specifies the features currently implemented in OpenEye, but the description below should not be intended to limit OpenEye applicability to these features alone.

Luminance, Color

Luminance and Color are extracted from the Log-polar RGB Image.

Input:

| Name | Data Type | Data Dimensions | Element Type | Element Dimensions | Metric | Base |
|---|---|---|---|---|---|---|
| RGB Image I = [r g b] | Vector Field | [$w_s$, $h_s$] | Unsigned, Byte | 3 | Log-polar | Sensor-centered |

Output:

| Name | Data Type | Data Dimensions | Element Type | Element Dimensions | Metric | Base |
|---|---|---|---|---|---|---|
| Color $O_c = [h\ s\ v]$ | Vector Field | $[w_s\ h_s]$ | Unsigned, Byte | 3 | Log-polar | Sensor-centered |
| Luminance $O_L$ | Scalar Field | $[w_s\ h_s]$ | Unsigned, Byte | 0 | Log-polar | Sensor-centered |

Processing $$O_l = r+g+b$$

$$O_{c=}[hsv]$$

Where:

$$v = \max_s(rgb);$$

$$s = \frac{v - \min(rgb)}{v};$$

$$h = \begin{cases} \frac{60(g-b)}{v-\min(rgb)} & \text{if } v = r \\ \frac{120 + 60(b-r)}{\min(rgb)} & \text{if } v = g \\ \frac{240 + 60(r-g)}{\min(rgb)} & \text{if } v = b \end{cases}$$

Segmentation (180)

This module builds preliminary segmentation producing binary image that represent closed (bounded) regions (Suzuki & Abe, 1985). This is achieved by using OpenCV function findContours, which operates on edges produced by the Canny edge detector (Canny, 1986). The result is the image with pixels set to 1 at the locations that belong to the bounded regions.

Input:

| Name | Data Type | Data Dimensions | Element Type | Element Dimensions | Metric | Base |
|---|---|---|---|---|---|---|
| Luminance | Scalar | $[w_s\ h_s]$ | Unsigned, Byte | 0 | Log-polar | Sensor-centered |

Output:

| Name | Data Type | Data Dimensions | Element Type | Element Dimensions | Metric | Base |
|---|---|---|---|---|---|---|
| Contours | Scalar Field | $[w_s\ h_s]$ | Binary, Byte | 0 | Log-polar | Sensor-centered |

Figure/Ground Segregation (180)

This module builds a shroud around the object at the center of the view. This is achieved via a seeded flood fill algorithm, which uses the OpenCV floodFill function. This algorithm fills a connected component starting from the center of the log-polar image produced by the segmentation module (180). Connectivity is determined by the brightness closeness of the neighbor pixels. As the result this step produces a shroud (Fazl et al., 2009), roughly fitting the form of the closed region that includes the foveated location (the center of the image).

Input:

| Name | Data Type | Data Dimensions | Element Type | Element Dimensions | Metric | Base |
|---|---|---|---|---|---|---|
| Contours I | Scalar Field | $[w_s\ h_s]$ | Binary, Byte | 0 | Log-polar | Sensor-centered |

Output:

| Name | Data Type | Data Dimensions | Element Type | Element Dimensions | Metric | Base |
|---|---|---|---|---|---|---|
| Shroud O | Scalar Field | $[w_s\ h_s]$ | Binary, Byte | 0 | Log-polar | Sensor-centered |

Processing:

$$O_{ij} = \begin{cases} I_{ij} & \sum_{\substack{i=-1,0,1 \\ j=-1,0,1}} (I_{ij} == I_{i+n,j+m}) > 1 \\ 0 & \sum_{\substack{i=-1,0,1 \\ j=-1,0,1}} (I_{ij} == I_{i+n,j+m}) = 1 \end{cases};$$

The Figure/ground segregation module (180) can also be extended to accept input from the What System, for instance in the form of semantic information pertaining the identity of pixels which can be obtained via a fast processing of the visual information that bypasses the Where System. For instance, a separate What System can be trained to recognize, on a pixel-by-pixel basis, areas in the image. E.g., the separate What System can initially classify areas of the image as "sky", "grass", "road", and this information can be used as input to the Figure/ground segregation module (180) as additional input to drive figure/ground segregation.

Hot Spot Selection (190)

This module produces a vector that determines the next foveation location. The module determines the most salient locations on the image by using the OpenCV function goodFeaturesToTrack, which finds the most prominent corners in the image as described in (Shi and Tomasi, 1994). The image passed to the corner finding algorithm is the luminance feature produced by the feature extraction module (240). The Inhibition of Return signal produced by the log-polar transformation module (230) disables the non-zero locations on the image to be selected as the next foveation position.

Input:

| Name | Data Type | Data Dimensions | Element Type | Element Dimensions | Metric | Base |
|---|---|---|---|---|---|---|
| Contours I | Scalar Field | $[w_s\ h_s]$ | Unsigned, Byte | 0 | Log-polar | Sensor-centered |

-continued

| Name | Data Type | Data Dimensions | Element Type | Element Dimensions | Metric | Base |
|---|---|---|---|---|---|---|
| Inhibition of Return mask $I_r$ | Scalar Field | $[w_s\ h_s]$ | Binary, Byte | 0 | Log-polar | Sensor-centered |

Output:

| Name | Data Type | Data Dimensions | Element Type | Element Dimensions | Metric | Base |
|---|---|---|---|---|---|---|
| HotSpot O | Vector | 0 | Unsigned Byte | 2 | Log-polar | Sensor-centered |

Processing:

Finding most prominent corners in the input image follows the algorithm below:

1. Covariation matrix $M_{ij}$ is computed for every pixel in the image for the 3×3 neighborhood $N_{ij}$ $$M = \begin{bmatrix} \sum_{N_{ij}}\left(\frac{dI}{dx}\right)^2 & \sum_{N_{ij}}\left(\frac{dI}{dx}\frac{dI}{dy}\right)^2 \\ \sum_{N_{ij}}\left(\frac{dI}{dx}\frac{dI}{dy}\right)^2 & \sum_{N_{ij}}\left(\frac{dI}{dx}\right)^2 \end{bmatrix}.$$

The derivatives are computed using the Sobel operator by convolving the input with the following kernels $$\frac{dI}{dx} = conv\left(I, \begin{bmatrix} -1 & 0 & -1 \\ -2 & 0 & 2 \\ -1 & 0 & -1 \end{bmatrix}\right) \text{ and }$$

$$\frac{dI}{dy} = conv\left(I, \begin{bmatrix} -1 & -2 & -1 \\ 0 & 0 & 0 \\ -1 & -2 & -1 \end{bmatrix}\right)$$

and $$\lambda = \min(\lambda_1, \lambda_2),$$

where $\lambda_1, \lambda_2$ are unsorted eigenvalues of M

2. Eigen values are used as a measure of corner quality, which are sorted and the locations below the quality threshold $T_q$ ($T_q$=0.001) are rejected.

At this point the list of candidates $O_c$ containing locations in the image I where eigenvalues exceed the threshold $T_q$ is produced. The mask signal $I_r$ is used to exclude the candidates, for which $I_r \neq 0$.

3. The remaining candidates are tested in descending order as new seeding points, with the floodFill function (see 3.4). If figure ground/segregation is possible for the given candidate (the seeded value does not flood over log-polar image boundary, i.e. image corners) it becomes the next selected foveation point, in other words—the output vector O. Otherwise the process is repeated for the next candidate until good hot spot is found capable of producing a shroud.

Temporal Object Continuity (200)

In order to build view invariant object identity, OpenEye may maintain temporal continuity between subsequent object foveations. OpenEye determines if the next foveation location falls off the current object surface in order to signal the object recognition system that building of the new object identity begins or continues. This is achieved via producing the RESET signal, which is set to 1 in the next cycle when the selected new foveation location falls off the shroud (output of module 210) built from seeded activity in the center point of the view.

| Name | Data Type | Data Dimensions | Element Type | Element Dimensions | Metric | Base |
|---|---|---|---|---|---|---|
| Shroud I | Scalar Field | $[w_s\ h_s]$ | Binary, Byte | 0 | Log-polar | Sensor-centered |
| HotSpot $I_h = [x\ y]$ | Vector | 0 | Unsigned, Byte | 2 | Log-polar | Sensor-centered |

Output:

| Name | Data Type | Data Dimensions | Element Type | Element Dimensions | Metric | Base |
|---|---|---|---|---|---|---|
| RESET O | Scalar | 0 | Binary Byte | 0 | Log-polar | Sensor-centered |

Processing:

$O = I_{xy}$;

Implementation of temporal continuity requires referencing discovered objects in space. Since individual components of the OpenEye require different encoding of space to refer to the object's location, several OpenEye computations involve translating spatial references between coordinate frames, different metrics, and different types of coordinate system. The following table summarizes usage of spatial representations by individual OpenEye Components:

| Open Eye Data | Frame of Reference | Metrics | Coordinate type |
|---|---|---|---|
| Object Map | Camera-centered | Linear | Spherical (pitch, yaw, distance) |
| Object Memory | Allocentric | Linear | Cartesian (X, Y, Z) |
| Camera Position Orientation | Egocentric | Linear | Euler (pitch, yaw, roll = 0) |
| Robot Location | Allocentric | Linear | Cartesian (X, Y, Z) |
| Robot Orientation | Allocentric | Linear | Euler (yaw, pitch, and roll) |
| Shroud | Camera-centered | Log | Cartesian (X, Y) |
| Inhibition of Return | Camera-centered | Log | Cartesian (X, Y) |
| Disambiguation Map | Camera-centered | Log | Cartesian (X, Y) |
| Hot Spot (Next Foveation) | Camera-centered | Log | Cartesian (X, Y) |

In an allocentric frame of reference, the location of one object is defined relative to the location of other objects. (In an egocentric frame of reference, on the other hand, an object's location is defined relative to the body axes of the robot.) For example, an allocentric coordinate frame can be aligned as follows: Axis Y—up vertically, axis Z with initial robot heading, and axis X in the direction perpendicular to axes Y and Z. In OpenCV (the software framework used to develop OpenEye) the direction of axis y is reversed. OpenCV representation is used for camera-centered frame of reference. Orientation is encoded by the Euler angles: yaw, pitch, and roll. Camera-centered representations could be expressed in spherical coordinates, with the X, Y treated as yaw and pitch angles, while the distance to the projected pixel will correspond to the radius R. This spherical interpretation of the camera-centered projection will be used to describe coordinate transformation. Two types of coordinate transformation are crucial for the approach to temporal continuity:

1) Translation of spatial reference from camera-centered to allocentric coordinates; and
2) Mapping location in allocentric coordinates to the camera-centered frame of reference.

The first may be utilized for learning discovered objects' locations; the second may be utilized for maintaining awareness of discovered objects in the field of view. After log-polar transformation, OpenEye segments the image and shroud a foveated object. Once the object shroud is produced, the location of the foveated object can be added to the object memory, where it is stored in allocentric coordinates for future referencing. Thus, position of the object in the sensed image should be transformed to the allocentric location given the current robot position, orientation as well as camera orientation. Finally a new hotspot is selected, which should cause new saccade, sensing new image and translating the hotspot position into a frame, where a new shroud will be produced using seeded filling-in from the adjusted hotspot position, which should take into account robot ego-motion.

Figure 6:
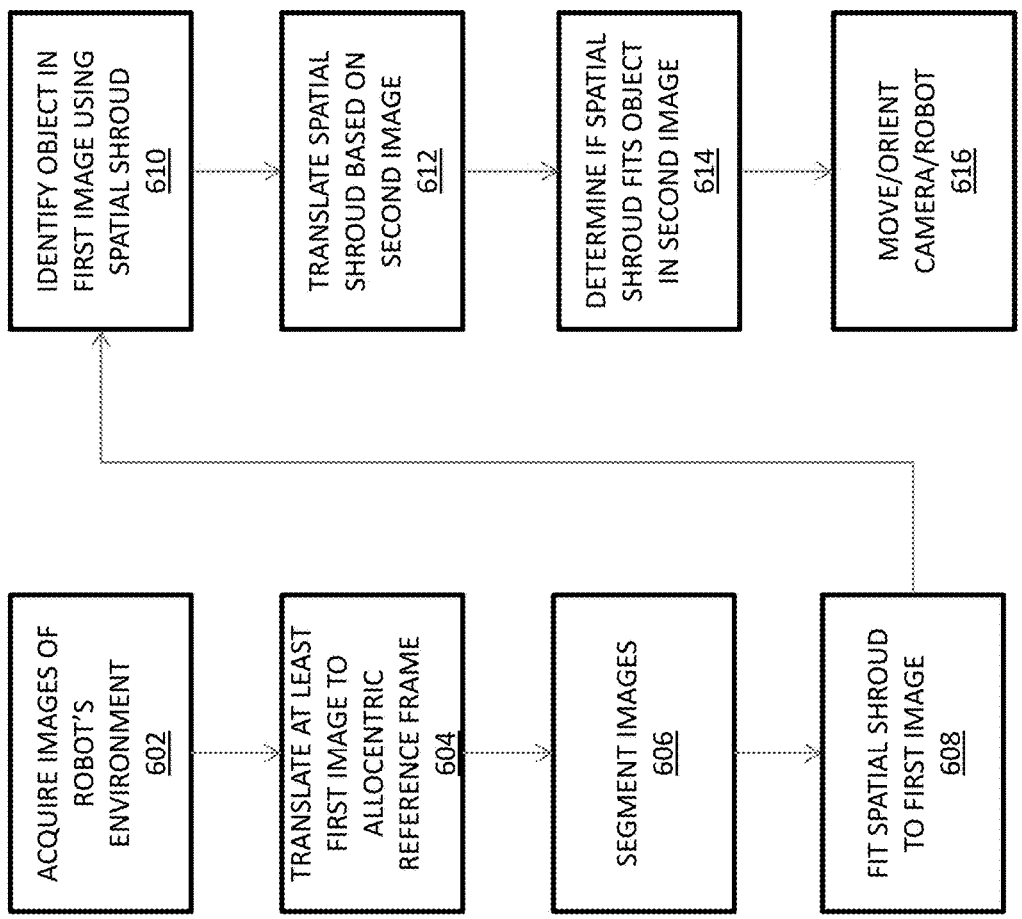
FIG. 6 illustrates a process for identifying and locating objects in a robot's environment by fitting a spatial shroud to successive images of the robot's environment.

FIG. 6 provides an overview of how the OpenEye determines temporal object continuity. In block 602, an image sensor, which may or may not be mounted to the robot, obtains imagery of the robot's environment. One or more OpenEye processors translate one or more these images from the camera frame of reference to an allocentric frame of reference (e.g., a log-polar frame of reference) in block 604. The OpenEye processor then segments the translated images in block 606. Next, the OpenEye processor constructs a spatial shroud for a first image (block 608) based on the current position and orientation of the input sensor and uses the shroud to identify an object in the first image (block 610). It then translates, rotates, skews, and/or otherwise transforms the shroud to account for the sensor's change in orientation and/or position between acquisition of the first image and a second image (block 612).

The processor then determines if the transformed shroud maps to an object in the second image (block 614). If so, the processor determines that the object in the second image is the same as the object that appears in the first image and learns the object's location (e.g., stores a representation of the object, its features, and/or its position in memory for later retrieval). At this point, the processor may use an actuator to orient and/or position the sensor in order to image a different portion of the robot's environment. If the shroud does not overlap with an object sufficiently in the second image, the processor determines that the objects are different and updates its memory accordingly. The processor may then actuate the sensor to obtain additional images of the object and the surrounding portion of the robot's environment.

FIGS. 7A-7C illustrate the shroud construction and translation process. In FIG. 7A, the sensor is centered on a face 702, where the center is marked by the dashed lines through the field of view. The OpenEye processor 704 shroud is built around this face 702, shown by the gray shading in the diagram. After the sensor is reoriented and another image acquired, the shroud 704 is translated and rotated to compensate for the sensor motion. If the sensor is now centered on a location marked by the shroud 704 in FIG. 7B, the system identifies that this object is the same as the one previously viewed. If the sensor is instead centered on a location off of the shroud 704, as in FIG. 7C, the system identifies and learns views of a new object.

Note that the What system (aka the classifier or semantics module) can also contribute to controlling the Where system (aka the spatial attention module). In particular, if the What system has gathered enough evidence (namely, a certain number of classifications where confidence is high) about the foveated object, it may cause the Where system to stop foveating that object, producing Inhibition Of Return (IOR) for a few time steps in the future, so as to bias the visual system to classify other objects in the scene.

Translating Spatial References from Camera-Centered to Allocentric Coordinates

Location in allocentric coordinates can be computed from local reference as following:

$$\begin{vmatrix} X_o \\ Y_o \\ Z_o \end{vmatrix} = |R_A|^{-1} \times \begin{vmatrix} x_o \\ y_o \\ z_o \end{vmatrix} + T_A \quad (3.6.1)$$

Where:

$$\begin{vmatrix} X_o \\ Y_o \\ Z_o \end{vmatrix}$$

Position vector in the allocentric frame of reference.
$|R_A|$ robot rotation matrix in allocentric coordinates $$\begin{vmatrix} x_o \\ y_o \\ z_o \end{vmatrix}$$

Position vector in the egocentric frame of reference.
$T_A$ is the robot translation vector in egocentric coordinates, which can be obtained directly from the GPS system in virtual environment.
$|R_A|$ can be computed from GPS orientation sensory signal as following:

$$R_A = \begin{vmatrix} \cos(y)\cos(p) & \sin(y)\sin(r) - \cos(y)\sin(p)\cos(r) & \sin(y)\cos(r) + \cos(y)\sin(p)\sin(r) \\ \sin(p) & \cos(p)\cos(r) & -\cos(p)\sin(r) \\ -\sin(y)\cos(p) & \sin(y)\sin(p)\cos(r) + \cos(y)\sin(r) & -\sin(y)\sin(p)\sin(r) + \cos(y)\cos(r) \end{vmatrix} \quad (3.6.2)$$

Where y, p, and r correspond to yaw, pitch, and roll of the robot in allocentric coordinates.

$$\begin{vmatrix} x_o \\ y_o \\ z_o \end{vmatrix}$$

is computed from the position $(x_s,y_s)$ in camera-centered coordinates, which is the output of the hot spot selection module. First, $(x_s,y_s)$ should be translated to egocentric frame using camera position $(E_x,E_y)$ in egocentric frame of reference. This enables us to compute location direction in the egocentric frame of reference. The angles in the egocentric coordinate system can be computed according to (3.6.3).

$$X_e = x_s + E_x; \quad (3.6.3a)$$

$$Y_s = x_y + E_y \quad (3.6.3b)$$

Now we can compute the location's Cartesian egocentric coordinates for the equation (3.6.1) using the distance information obtained from the depth sensor. Taking into account reversed orientation of the y axis in OpenCV, position vector $$\begin{vmatrix} x_o \\ y_o \\ z_o \end{vmatrix}$$

can be computed according to (3.6.4)

$$\begin{vmatrix} x_o \\ y_o \\ z_o \end{vmatrix} = \begin{vmatrix} -\cos(X_e)\sin(Y_e) \\ -\sin(X_e)\sin(Y_e) \\ \cos(Y_e) \end{vmatrix} \times d_{xy} \quad (3.64)$$

Where:

$d_{xy}$ is the depth signal available from the depth sensor in virtual environment. $d_{xy}$ corresponds to the distance from the robot to the location represented by pixel c The range of distances sensed by the depth sensor in virtual environment is determined by the frustum settings for the virtual camera and currently is set to the interval from 0.5 meters to 1000 meters. The distances are normalized between 0 and 1. Everything closer the low frustum bound is sensed as 0. Everything further than upper frustum bound is sensed as 1.

Computing hotspot location requires translation of position of the selected pixel from log to linear metric with subsequent translation of the linear pixel position into the spherical angles specific to camera angle of view and the resolution.

$$x_s = P_x * R_x, \quad (3.6.5a)$$

$$y_s = P_y * R_y \quad (3.6.5b)$$

Where:

$(P_x, P_y)$ is the position of the selected hotspot translated from log to linear metric $(R_x, R_y)$ is the resolution in radians/pixel in x and y direction correspondingly.

$R_x$ and $R_y$ can be determined from the size of the image $(S_x, S_y)$ and the size of the field of view $(V_x, V_y)$, which for our simulation was set to (600,600) and ($\pi/2$, $\pi/2$) correspondingly.

$P_x$ and $P_y$ are computed using reverse log-polar mapping as following $$(P_x P_y) = \begin{cases} [ij]d(i,j) < R_f & d(i,j) = \sqrt{(i-i_0)^2 + (j-j_0)^2} \\ [xy]d(i,j) \geq R_f & d(i,j) = \ln d(x,y) \end{cases} ; \quad (3.6.6)$$

Where:

[i j] is a hotspot location (row, column) in log-polar view in the camera-centered frame of reference $$R_f = \frac{\max(W_s, H_s)}{24}; \; i_0 = \frac{H_s - 1}{2}; \; j_0 = \frac{W_s - 1}{2};$$

$$H_s = 2R_f \log\left(\frac{S_y}{2R_f} + 1\right); \; W_s = 2R_f \log\left(\frac{S_x}{2R_f} + 1\right)$$

$R_f$ is foveal radius as percentage of entire retina.
$W_s$ and $H_s$ correspond to log-polar mapping of the image sensor dimensions $(S_x, S_y)$ When an object, whose shape is defined by the shroud is learned by the What system, its location and the shroud is stored in the Object Memory in allocentric coordinates [X,Y,Z]. The allocentric coordinate system is aligned with the initial robot location and orientation so the Z axis is aligned with the heading of the robot.

Mapping Location from Allocentric to the Camera-Centered Frame of Reference

Pixel location in camera-centered coordinates $(x_s,y_s)$ can be computed from its egocentric Cartesian coordinates $(x_0, y_0, z_0)$ as following:

$$x_s = \frac{E_x + \tan^{-1}\frac{y_0}{x_0}}{R_x} \quad (3.6.7a)$$

$$y_s = \frac{E_y + \cos^{-1}\frac{z_0}{d}}{R_y} \quad (3.6.7b)$$

Where:

$d = \sqrt{x_0^2 + y_0^2 + z_0^2}$ is the distance to the point $(x_s, y_s)$ in the egocentric coordinates.
$R_x$, and $R_y$ is the resolution in radians/pixel in x and y direction correspondingly.
$E_x$ and $E_y$ are camera position in egocentric coordinates $$\begin{vmatrix} x_o \\ y_o \\ z_o \end{vmatrix} = |R_A| \times \begin{vmatrix} X_o \\ Y_o \\ Z_o \end{vmatrix} - T_A \quad (8)$$

Where:

$$\begin{vmatrix} X_o \\ Y_o \\ Z_o \end{vmatrix}$$

Position vector in the allocentric frame of reference.
$|R_A|$ robot rotation matrix in allocentric coordinates
$T_A$ is the robot translation vector in egocentric coordinates, which can be obtained directly from the GPS system in virtual environment.

OpenEye Implementation of Temporal Continuity

In OpenEye, temporal continuity is based on the ability to learn the location of the object selected during the foveation (camera movement) cycle. The location is learned by translating pixel position corresponding to the object in the camera-centered coordinates into object location in allocentric coordinates. This is done using equations (3.6.1)-(3.6.6).

To ensure awareness of previously learned objects, their locations is translated from allocentric coordinates stored in object memory into camera-centered representation at each foveation cycle using equations (3.6.7) and (3.6.8).

Similarly to objects, hot spot pixel position is translated to allocentric coordinates using equations (3.6.1)-(3.6.5) In the next foveation cycle, the position of hotspot is recomputed using equations (3.6.6) and (3.6.7) forming the shroud around the foveated object by seeded filling-in starting from the hotspot selected at the previous foveation cycle Foveation Memory (250)

The term "foveation" adopted below is borrowed from the neuroscience literature, where foveation represents the location of eye fixation. Foveation memory in OpenEye represents past foveation activity over the visual image. When OpenEye operates on static images, foveation means sampling of the image, at a particular (foveated) location. Usually size of the sampled image is much smaller than the entire image(scene) size. When OpenEye operates in real 3D or virtual environment, foveation is sampling of that environment as the result of real or virtual camera movement. The visual memory is maintained over the spatial area that depends on the environment. It could amount to the entire image as in the case of static scene environment, or over the region of space that is currently in the view as in the case of movies or virtual environment. Foveation memory inhibits foveations at the locations that have been foveated in the past. After making a camera movement, OpenEye sets foveation activity at the maximum value (255), this activity decays with each foveation and eventually, when it decays to 0, the location is enabled for new foveations. The Foveation Memory is maintained in the image-centered coordinate frame. However, the input (Sensor Position, 150) is provided in ego-centered coordinates.

The history gets updated with each new foveation cycles. The decay is implemented as a decrement by one with each foveation step. Initial value immediately after foveation is set to FMAX. This means that the same location cannot be foveated at least the next FMAX cycles.

Input:

| Name | Data Type | Data Dimensions | Element Type | Element Dimensions | Metric | Base |
|---|---|---|---|---|---|---|
| Sensor Position $I_s = [x, y]$ | Vector | 0 | Unsigned, Byte | 2 | Cartesian | Ego-centered |
| Foveation Memory $I_f$ | Scalar Field | $[W_i H_i]$ | Unsigned Byte | 0 | Cartesian | Image-centered |

Output:

| Name | Data Type | Data Dimensions | Element Type | Element Dimensions | Metric | Base |
|---|---|---|---|---|---|---|
| Foveation Memory O | Scalar Field | $[W_i H_i]$ | Unsigned Byte | 0 | Cartesian | Image-centered |

Processing:

$O = I_f + 255 * K(x,y) - 1$, where, $K(x,y)$ is a Gaussian kernel centered at location $[x, y]$, which effectively inhibits location around $[x,y]$ by adding them to the foveation memory $$K(x, y) = \begin{cases} \frac{1}{2\pi\sigma^2} e^{\frac{-1}{2\sigma^2} d^2} \\ 0 \text{ otherwise} \end{cases}$$

$$d < D d(i, j) = \sqrt{\left(i - \frac{D}{2}\right)^2 + \left(j - \frac{D}{2}\right)^2} \; ; \sigma = 4; D = 1.$$

Inhibition of Return (220)

The purpose of the Inhibition of Return module (220) is to prevent repeated foveations at the same spatial location. To achieve that this module extracts the section of the foveation history around the next foveation location that falls in the view of the next saccade.

Input:

| Name | Data Type | Data Dimensions | Element Type | Element Dimensions | Metric | Base |
|---|---|---|---|---|---|---|
| Sensor Position $I_s = [x, y]$ | Vector | 0 | Unsigned, Byte | 2 | Cartesian | Ego-centered |
| Foveation Memory $I_f$ | Scalar Field | $[W_i H_i]$ | Unsigned Byte | 0 | Cartesian | Image-centered |

Output:

| Name | Data Type | Data Dimensions | Element Type | Element Dimensions | Metric | Base |
|---|---|---|---|---|---|---|
| Inhibition of return O | Scalar Field | $[W_s H_s]$ | Unsigned Byte | 0 | Cartesian | Sensor-centered |

Processing:

$$\begin{cases} I_f(X, Y) & 0 < X < W_I; 0 < Y < H_I \\ 0 & X > 0 \,|\, X > W_I \,|\, Y < 0 \,|\, Y > H_I \end{cases},$$

where $Y = y + i - i_0; X = x + j - j_0;$ $$i_0 = \frac{(H_s - 1)}{2}; j_0 = \frac{(W_s - 1)}{2}.$$

What System (150)

The What System (150) learns the identities of objects and visual scenes. The What System may, for example, group object views and learn them as a unified entity; maintain a lifelong memory while preventing memory degradation and saturation; make inferences about views acquired from the Where System, which objects they belong to, and the names associated with those objects; bias camera movements in the Where System in order to intelligently guide image sampling; and provide an interface by which an external user can communicate with and leverage the system's knowledge.

The What System is implemented as a series of hierarchically organized classifiers that perform unsupervised view clustering, classification of view categories into object categories based on the reset signal from the Where System, and supervised or unsupervised categorization of objects into name categories. After learning occurs, the activation of a name category primes the What system by inhibiting those objects and views that are not associated with that name category, further tuning the system by discouraging views from being shared between multiple objects and names. The activation of a name category can come from a bottom-up activation of a newly viewed object, persistent activation caused by a previously viewed object, or through external activation by another system or user. This external activation is provided by a Teacher (160) that represents the correct name of the foveated object to aid learning. OpenEye does not function in different modes to facilitate training or testing mechanisms, and it does not require a reset of the system upon transition to a new scene. FIG. 3 highlights the high level system diagram of the What Pathway (170), which includes the What System (150) and the Teacher (160).

The inspiration for hierarchical clustering of views into objects and names is detailed in the ARTScan model of visual learning (Fazl, Grossberg, and Mingolla, 2009). The Adaptive Resonance Theory (ART) learning scheme has been altered from this work by replacing the learning system of the view layer with a variant of Fuzzy Simplified ART (F-SART; Baraldi and Alpaydin, 1998).

The View layer (280) clusters shroud-gated visual representations of object views according to their feature similarity. The Object layer (290) learns pose-invariant object representations by associating different view prototypes according to their temporal continuity provided by the reset signal from the Where system. The Name layer (300) further groups different objects under the same user label if given from an optionally present Teacher (160). As an external teacher shapes the association between objects and their labels, this information is fed back from the Name layer to the Object and View layers to improve the speed and accuracy of future object learning.

Disambiguation map (310)

This section describes in detail the Disambiguation Map as introduced by Sherbakov et al. (2013a, b). A single input view passed to the What System can activate multiple view, object, and name nodes. Although the output of each of these layers is sparse, the system output can occasionally be unsure about object identity in the absence of an external teacher. This is called "object ambiguity", as a single view of an object can be associated with many objects.

To facilitate object disambiguation, OpenEye uses a novel, dynamically constructed, disambiguation map that suggests potential saccade targets to the Where Pathway that would maximally inform the What System as to which of the potential object representations best matches the actual viewed object. This map compares those views within the resonant domain that are activating disparate object categories, and activates the disambiguation map in the areas where input and view prototypes disagree.

The map is currently defined as the weighted average of the feature differences between the input $\vec{x}$ and weight templates $\vec{W}_j^{xv}$, where each template is mixed only if a view $v_j$ in the resonant domain is coactive with its associated object category $o_j^v$. Specifically, the disambiguation map $\vec{\gamma}$ is defined as $$\vec{\gamma} = \frac{\sum_j o_j^v v_j |\vec{W}_j^{xv} - \vec{x}|}{\sum_j o_j^v v_j}, \quad (280.7)$$

where $o_j^v$ is the feedback activity of the object category layer to a particular view category $j$, whose activities are given by $$\vec{o}^v = f_\infty(W^{vo}\vec{o}). \quad (280.7a)$$

Note that equation 280.7 could be modified to include multiple features by including a sum over features m.

Alternative OpenEye What System: Stable Sparse Coding

Figure 4:
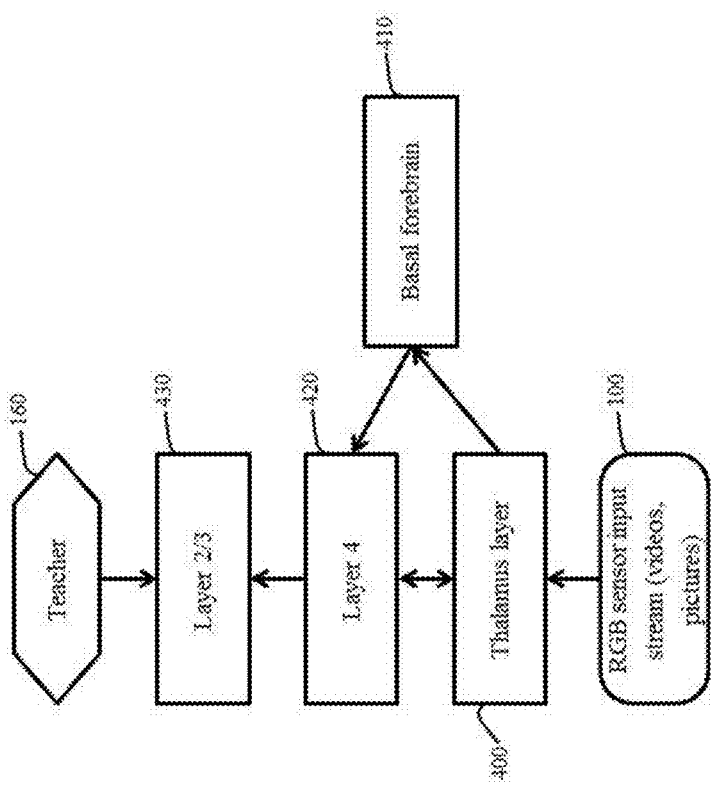
FIG. 4 is a block diagram of an alternative classifier architecture suitable for implementing the view layer and the object layer in the What Pathway module shown in FIG. 3.

FIG. 4 shows an alternative classifier architecture for the view layer 280 and object layer 290 in FIG. 3. This alternative classifier architecture goes beyond the Fuzzy Simplified ART (f-sART; Baraldi and Alpaydin, 1998). FIG. 4 shows that this alternative classifier is organized in several submodules that mimic some properties of the respective cortical and subcortical areas that they are named after (FIG. 4):

Thalamus layer (400)
Basal Forebrain (410)
Layer 4 (420)
Layer 2/3 (430).

As shown in FIG. 4, the thalamus layer 400 receives or obtains input from a sensor—in this case, image data, such as still pictures or video, from the RGB sensor 100. The thalamus layer 400 pre-processes the sensor data and provides inputs to Layer 4 (420) and the Basal Forebrain (100). Layer 4 learns online to represent its input (400), whereas Basal Forebrain (410) regulates learning in (420). Layer 2/3 (430) maps the learned representation in Layer 4 (420) to discrete classes which can be defined by a teacher (160)

One example of this system has been reduced to practice in a synthetic alphabet dataset comprised of an 28 by 28=784 input image, where 2N=1568 is the total size of the input image in (100) after complement coding, R=400 is the number of coding cells (410), and M=26 is the size of layer 2/3 (430).

Thalamus (400)

Unsupervised learning of a sparse encoder occurs in the synapses between thalamus (400) and Layer 4 (410). The sensor input, I, is processed through (400) as a shunting network, x, intended to represent the on-center off-surround processing in the thalamic relay cells. The inputs (100) and Thalamus (400) are represented here as two-dimensional fields with indices i and j, which run from 1 to n (28). The thalamus (400) includes two channels, light and dark, that receive the positive input and its complement, respectively. The activities are denoted $x^L$ for the light channel and $x^D$ for the dark channel:

$$\frac{dx_{ij}^L}{dt} = \left[-\alpha_x x_{ij}^L + \sum_{kl} g_{i,j,k,l}(B - x_{ij}^L)(I_{kl}) - Dx_{ij}^L \sum_{kl} h_{i,j,k,l}(x_{kl}^L) + E(C - x_{ij}^L)\sum w_{ijr}Y_r\right]/\tau_x, \quad (1)$$

and $$\frac{dx_{ij}^D}{dt} = \left[-\alpha_x x_{ij}^D + \sum_{kl} g_{i,j,k,l}(B - x_{ij}^D)(1 - I_{kl}) - Dx_{ij}^D \sum_{kl} h_{i,j,k,l}(x_{kl}^D) + E(C - x_{ij}^D)\sum w_{ijr}Y_r\right]/\tau_x, \quad (2)$$

where $\alpha_x=0.4$, B=1, C=−0.1, D=0.05, E=0.15, $\tau_x=6$ and g is a Gaussian function of the difference between i and k centered around 0 (mean) with a width of 0.4 (the standard deviation), h is a likewise function of a width 2.8. The parameter C corresponds to a hyperpolarization value.

Basal Forebrain (410)

The basal forebrain includes a single cell (b, a) which responds to fluctuations in the activities of thalamic cells (400) from both channels:

$$\frac{db}{dt} = \left[-b + G\sum_{ij} \frac{x_{ij}}{2N}\right]/\tau_b, \text{ and} \quad (3)$$

$$a = \left|\varepsilon_a + l\left(G\sum_{ij} \frac{x_{ij}}{2N} - b\right) + H\sum_{ij} l\left(-\frac{x_{ij}}{N} - V\right)\right|, \quad (4)$$

where G=2, V=0.00001, H=1.8, $\tau_b=0/0.13$, $\epsilon_a=0.009$, and a represents the cholinergic signal. The function l is a threshold linear function that nullifies all negative values:

$$l(u) = \begin{cases} u, & u > 0 \\ 0, & u \leq 0 \end{cases}. \quad (5)$$

This cholinergic signal drives a slower signal that biologically might correspond to muscarinic receptor activation:

$$\frac{d\bar{a}}{dt} = \frac{-\bar{a} + Ja}{\tau_{\bar{a}}}, \text{ and} \quad (6)$$

$$\hat{a} = l(\bar{a}) + \varepsilon_{\bar{a}}, \quad (7)$$

where J=0.9, $\tau_{\bar{a}}=20$, and $\epsilon_{\bar{a}}=0.001$.

Layer 4 (420)

The activities at cortical coding cells in layer 4 (y) fluctuate based on their thalamic input (x), lateral inhibition and modulation (420):

$$\frac{y_r}{dt} = \left[f_y\left(-t_r + \sum_{ij} w_{ijr}|x_{ij}| + \sum_s q_{sr}y_s\right) - y_r(C_y a + \alpha_y)\right]/\tau_y, \quad (8)$$

where $C_y=3.1$, $\alpha_y=0.001$, and $\tau_y=2.5$. The signal function is a logistic function:

$$f_y(u) = \frac{1}{1 + e^{-\beta_y(u)}}, \quad (9)$$

where $\beta_y=30$. Layer 4 cortical activity must exceed a threshold before it affects learning or it is transmitted back to thalamus:

$$Y_r = \begin{cases} 1, & y_r \geq 0.5 \\ 0, & y_r < 0.5 \end{cases}. \quad (10)$$

Excitability homeostasis occurs at Layer 4 (y, Y) neurons by adaptive thresholds (t):

$$\frac{dt_j}{dt} = \frac{(Y_r - \rho)(C_t a + \theta_T)}{\tau_t} \quad (11)$$

where $C_t=0.6$, $\theta_T=0.3$, $\tau_t=1/0.06$, and $\rho$ is the sparseness parameter, set to 0.05. The values for $t_j$ are set to random values uniformly chosen from the range 0.5 to 2.3. The learning from Thalamic neurons (x, 400) to Layer 4 neurons (y, Y, 420) is governed by:

$$\frac{w_{ijr}}{dt} = \lambda((|x_{ij}| - w_{ijr})Y_r)/\tau_w, \quad (12)$$

where $\tau_w=384$. The lateral inhibition (q) at Layer 4 (y, Y) is adaptive (an "anti-Hebbian" law):

$$\frac{q_{rs}}{dt} = -\lambda(Y_rY_s - \rho^2)/\tau_q, \quad (13)$$

where $\tau_q=167$. The learning rate $\lambda$ is a function of the strength of feedback and the ratio of cholinergic modulation:

$$\lambda = L\left|\left(\sum_{ijr} \frac{4Ew_{ijr}Y_r}{2N}\right) - 1\right| + C_\lambda \frac{\hat{a}}{a} + \varepsilon_\lambda, \quad (14)$$

where L=0.12, $C_\lambda=0.04$, and $\epsilon_\lambda=0.005$.

Layer 2/3 (430)

In this system, supervised learning of visual categories occurs in the synapses between later 4 (420) and layer 2/3 (430). Specifically, layer 2/3 neurons (z, 430) use a variant of the recurrent shunting on-center off-surround network:

$$\tau_z \frac{dz_m}{dt} = -\alpha_z z_m + (B - z_m)\left[T_m + f_z(z_m) + \frac{D_z}{R}\sum_r \omega_{rm}Y_r\right] - z_m\left[C_z(1 - T_m) + \sum_k f_z(z_k)\right]. \quad (15)$$

where $\alpha_y=0.2$, B=1, $\tau_z=1/0.75$, $D_z=120$, $C_z=0.1$ and T is the aforementioned supervision, or Teacher (160), vector (i.e. the truth or target output). The supervision, therefore, acts as an input to the Layer 2/3 cells. It does not directly appear in the synaptic learning law. In this way, the full circuit is stackable in a hierarchical way. Higher cortical areas can simply send feedback that acts as this supervision signal. The signal function is a logistic function:

$$f_z(u) = \frac{1}{1 + e^{-\beta_z(u - \sigma_z)}}, \quad (16)$$

where $\sigma_z = 0.65$ and $\beta_y = 15$, and corresponds to slope and threshold, respectively. The learning from Layer 4 neurons (y, Y) to Layer 2/3 neurons (z) is governed by:

$$\tau_\omega \frac{d\omega_{rm}}{dt} = \lambda_\omega \left( \frac{Y_r}{R} - \omega_{rm} \right) f(z_m) \left[ \varepsilon_\omega + \sum_k f_z(z_k) \right]^2 + \omega_{rm} \left( \beta_\omega - \sum_r \omega_{rm} z_m \right) \quad (17)$$

where $\lambda_\omega = 0.6$, $\beta_\omega = 0.04$ (400*0.0001), $\tau_\omega = 1/0.002$, and $\varepsilon_\omega = 0.001$.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

REFERENCES

The following references are incorporated herein by reference in their respective entireties:

Adelson, E. H., Anderson, C. H., Bergen, J. R., Burt, P. J., & Ogden, J. M. (1984). Pyramid methods in image processing. RCA engineer, 29(6), 33-41.

Baraldi, A. and Alpaydin, E. (1998). Simplified ART: A new class of ART algorithms. International Computer Science Institute, Berkeley, Calif., TR-98-004, 1998.

Baraldi, A. and Alpaydin, E. (2002). Constructive feedforward ART clustering networks—Part I. *IEEE Transactions on Neural Networks* 13(3), 645-661.

Baraldi, A. and Parmiggiani, F. (1997). Fuzzy combination of Kohonen's and ART neural network models to detect statistical regularities in a random sequence of multi-valued input patterns. *In International Conference on Neural Networks*, IEEE.

Bengio, Y., Courville, A., & Vincent, P. (2013). Representation learning: A review and new perspectives.

Besl, P. J., & Jain, R. C. (1985). Three-dimensional object recognition. ACM Computing Surveys (CSUR), 17(1), 75-145.

Bradski, G., & Grossberg, S. (1995). Fast-learning VIEWNET architectures for recognizing three-dimensional objects from multiple two-dimensional views. *Neural Networks,* 8 (7-8), 1053-1080.

Canny, J., A (1986) Computational Approach To Edge Detection, *IEEE Trans. Pattern Analysis and Machine Intelligence,* 8(6):679-698. Carpenter, G. A. and Grossberg, S. (1987). A massively parallel architecture for a self-organizing neural pattern recognition machine. *Computer Vision, Graphics, and Image Processing* 37, 54-115.

Carpenter, G. A., & Grossberg, S. (1987). A massively parallel architecture for a self-organizing Carpenter, G. A., and Grossberg, S. (1995). Adaptive resonance theory (ART). In M. Arbib (Ed.), The handbook of brain theory and neural networks. (pp. 79-82). Cambridge, Mass.: MIT press.

Carpenter, G. A., Grossberg, S. and Rosen, D. B. (1991). Fuzzy ART: Fast stable learning and categorization of analog patterns by an adaptive resonance system. *Neural Networks* 4, 759-771.

Dosher, B. A., and Lu, Z. L. (2010). Mechanisms of perceptual attention in precuing of location. Vision Res., 40(10-12). 1269-1292.

Fazl, A., Grossberg, S., and Mingolla, E. (2009). View-invariant object category learning, recognition, and search: How spatial and object attention are coordinated using surface-based attentional shrouds. *Cognitive Psychology* 58, 1-48.

Foldiák, P. (1990). Forming sparse representations by local anti-Hebbian learning, Biological Cybernetics, vol. 64, pp. 165-170.

Friston K., Adams R., Perrinet L., & Breakspear M. (2012). Perceptions as hypotheses: saccades as experiments. Frontiers in Psychology, 3 (151), 1-20.

Geiger A, Lenz P, and Urtasun R (2012). Are we ready for autonomous driving? The KITTI vision benchmark suite. In *Computer Vision and Pattern Recognition (CVPR)*, Providence, USA.

George, D. and Hawkins, J. (2009). Towards a mathematical theory of cortical micro-circuits. *PLoS Computational Biology* 5(10), 1-26.

Grossberg, S. (1973). Contour enhancement, short-term memory, and constancies in reverberating neural networks. *Studies in Applied Mathematics* 52, 213-257.

Grossberg, S., and Huang, T. R. (2009). ARTSCENE: A neural system for natural scene classification. *Journal of Vision*, 9 (4), 6.1-19. doi:10.1167/9.4.6

Grossberg, S., and Versace, M. (2008) Spikes, synchrony, and attentive learning by laminar thalamocortical circuits. *Brain Research*, 1218C, 278-312 [Authors listed alphabetically].

Hinton, G. E., Osindero, S., and Teh, Y. (2006). A fast learning algorithm for deep belief nets. Neural Computation, 18, 1527-1554.

Itti, L., and Koch, C. (2001). Computational modelling of visual attention. *Nature Reviews Neuroscience*, 2 (3), 194-203.

Itti, L., Koch, C., and Niebur, E. (1998). A Model of Saliency-Based Visual Attention for Rapid Scene Analysis, 1-6.

Jarrett, K., Kavukcuoglu, K., Ranzato, M. A., & LeCun, Y. (2009, September). What is the best multi-stage architecture for object recognition?. In Computer Vision, 2009 IEEE 12th International Conference on (pp. 2146-2153). IEEE.

Kowler, E. (2011). Eye movements: The past 25 years. *Vision Research*, 51(13), 1457-1483. doi:10.1016/j.visres.2010.12.014

Larochelle H., & Hinton G. (2012). Learning to combine foveal glimpses with a third-order Boltzmann machine. NIPS 2010, 1243-1251.

LeCun, Y., Kavukcuoglu, K., & Farabet, C. (2010, May). Convolutional networks and applications in vision. In Circuits and Systems (ISCAS), Proceedings of 2010 IEEE International Symposium on (pp. 253-256). IEEE.

Lee, D. D. and Seung, H. S. (1999). Learning the parts of objects by non-negative matrix factorization. Nature, 401 (6755):788-791.

Lee, D. D., and Seung, H. S. (1997). "Unsupervised learning by convex and conic coding." Advances in Neural Information Processing Systems, 9.

Lowe, D. G. (2004). Distinctive Image Features from Scale-Invariant Keypoints. Journal International Journal of Computer Vision archive Volume 60, 2, 91-110.

Lu, Z. L., Liu, J., and Dosher, B. A. (2010) Modeling mechanisms of perceptual learning with augmented Hebbian re-weighting. *Vision Research,* 50(4). 375-390.

Mishkin M, Ungerleider L G. (1982). "Contribution of striate inputs to the visuospatial functions of parieto-preoccipital cortex in monkeys," Behav Brain Res, 6 (1): 57-77.

Najemnik, J., and Geisler, W. (2009). Simple summation rule for optimal fixation selection in visual search. *Vision Research*. 49, 1286-1294.

neural pattern-recognition machine. Computer Vision Graphics and Image Processing, 37 (1), 54-115.

Oja, E. (1982). Simplified neuron model as a principal component analyzer. *Journal of Mathematical Biology* 15(3), 267-273.

Pessoa L, Thompson E, and Noë A (1998). Finding out about filling-in: A guide to perceptual completion for visual science and the philosophy of perception. *Behavioral and Brain Sciences* 21(6), 723-748.

Raijmakers, M. E. J., and Molenaar, P. (1997). Exact ART: A complete implementation of an ART network Neural networks 10 (4), 649-669.

Ranzato, M. A., Huang, F. J., Boureau, Y. L., & Lecun, Y. (2007, June). Unsupervised learning of invariant feature hierarchies with applications to object recognition. In Computer Vision and Pattern Recognition, 2007. CVPR'07. IEEE Conference on (pp. 1-8). IEEE.

Riesenhuber, M., & Poggio, T. (1999). Hierarchical models of object recognition in cortex. *Nature Neuroscience,* 2 (11), 1019-1025.

Riesenhuber, M., & Poggio, T. (2000). Models of object recognition. Nature neuroscience, 3, 1199-1204.

Rublee E, Rabaud V, Konolige K, and Bradski G (2011). ORB: An efficient alternative to SIFT or SURF. In *IEEE International Conference on Computer Vision (ICCV)*, 2564-2571.

Rublee, E., Rabaud, V., Konolige, K., & Bradski, G. (2011). ORB: An efficient alternative to SIFT or SURF. In *IEEE International Conference on Computer Vision (ICCV)* 2011, 2564-2571.

Rumelhart D., Hinton G., and Williams, R. (1986). Learning internal representations by error propagation. In *Parallel distributed processing: explorations in the microstructure of cognition*, vol. 1, MIT Press.

Russell B, Torralba A, Murphy K, and Freeman W T (2008). LabelMe: A database and web-based tool for image annotation. *International Journal of Computer Vision* 77(1-3), 157-173.

Salakhutdinov, R., & Hinton, G. E. (2009). Deep boltzmann machines. In International Conference on Artificial Intelligence and Statistics (pp. 448-455).

Seibert, M., & Waxman, A. M. (1992). Adaptive 3-D Object Recognition from Multiple Views. *IEEE Transactions on Pattern Analysis and Machine Intelligence,* 14 (2), 107-124.

Sherbakov, L., Livitz, G., Sohail, A., Gorchetchnikov, A., Mingolla, E., Ames, H., and Versace, M. (2013a) CogEye: An online active vision system that disambiguates and recognizes objects. NeuComp 2013.

Sherbakov, L., Livitz, G., Sohail, A., Gorchetchnikov, A., Mingolla, E., Ames, H., and Versace, M (2013b) A computational model of the role of eye-movements in object disambiguation. *Cosyne*, Feb. 28-Mar. 3, 2013. Salt Lake City, Utah, USA.

Smolensky, P. (1986). Information processing in dynamical systems: Foundations of harmony theory. In D. E. Rumelhartand J. L. McClelland, editors, Parallel Distributed Processing, volume 1, chapter 6, pages 194-281. MIT Press, Cambridge.

Spratling, M. W. (2008). Predictive coding as a model of biased competition in visual attention. Vision Research, 48(12):1391-1408.

Spratling, M. W. (2012). Unsupervised learning of generative and discriminative weights encoding elementary image components in a predictive coding model of cortical function. Neural Computation, 24(1):60-103.

Spratling, M. W., De Meyer, K., and Kompass, R. (2009). Unsupervised learning of overlapping image components using divisive input modulation. Computational intelligence and neuroscience.

Tong, F., Ze-Nian Li, (1995). Reciprocal-wedge transform for space-variant sensing," *Pattern Analysis and Machine Intelligence, IEEE Transactions on*, vol. 17, no. 5, pp. 500-51. doi:10.1109/34.391393

Torralba, A., Oliva, A., Castelhano, M. S., Henderson, J. M. (2006). Contextual guidance of eye movements and attention in real-world scenes: the role of global features in object search. *Psychological Review*, 113(4).766-786.

Versace, M. (2006) From spikes to interareal synchrony: how attentive matching and resonance control learning and information processing by laminar thalamocortical circuits. NSF Science of Learning Centers PI Meeting, Washington, D.C., USA.

Webster, Bachevalier, Ungerleider (1994). Connections of IT areas TEO and TE with parietal and frontal cortex in macaque monkeys. Cerebal Cortex, 4(5), 470-483.

The invention claimed is:

1. A method comprising:
  acquiring a plurality of images of at least a portion of an environment with an image sensor;
  constructing a spatial shroud fitting a form of an object in a first image of the plurality of images from the first image;
  identifying the object in the first image based at least in part on the spatial shroud;
  translating and/or transforming the spatial shroud based at least in part on a change in a position and/or an orientation of the image sensor;
  determining if the spatial shroud fits the form of the object in a second image in the plurality of images; and
  in response to determining that the spatial shroud fits the form of the object, identifying a position of the object in the environment based at least in part on the spatial shroud.

2. The method of claim 1, wherein constructing the spatial shroud comprises segmenting the first image.

3. The method of claim 1, wherein identifying the object includes creating a shroud-gated representation of a view of the object.

4. The method of claim 1, further comprising:
  extracting a feature from the first image; and
  identifying the object in the first image based at least in part on the feature.

5. The method of claim 4, wherein extracting the feature comprises applying a non-linear transformation to the first image.

6. The method of claim 4, further comprising:
  identifying similarities between the feature and a plurality of features identified in other images in the plurality of images.

7. The method of claim 6, further comprising:
  clustering the images in the plurality of images based at least in part on the similarities.

8. A system comprising:
  an image sensor to acquire a plurality of images of at least a portion of an environment;
  a processor communicably coupled to the image sensor, the processor to:
    construct a spatial shroud fitting a form of an object in a first image of the plurality of images from the first image;
    identify the object in the first image based at least in part on the spatial shroud;
    translate and/or transform the spatial shroud based at least in part on a change in a position and/or an orientation of the image sensor;
    determine if the spatial shroud fits the form of the object in a second image in the plurality of images; and
    in response to determining that the spatial shroud fits the form of the object in the second image, identify a position of the object in the environment based at least in part on the spatial shroud.

9. The system of claim 8, wherein the processor is configured to construct the spatial shroud by segmenting the first image.

10. The system of claim 8, wherein the processor is configured to identify the object by creating a shroud-gated representation of a view of the object.

11. The system of claim 8, wherein the processor is further configured to:
  extract a feature from the first image; and
  identify the object in the first image based at least in part on the feature.

12. The system of claim 11, wherein the processor is configured to extract the feature by applying a non-linear transformation to the first image.

13. The system of claim 11, wherein the processor is further configured to:
  identify similarities between the feature and a plurality of features identified in other images in the plurality of images.

14. The system of claim 13, wherein the processor is further configured to:
  cluster the images in the plurality of images based at least in part on the similarities.

15. The method of claim 1, further comprising:
  positioning and/or orienting the image sensor with respect to the object based at least in part on the object.

16. The method of claim 1, further comprising:
  adjusting a field of view of the image sensor based at least in part on the change in the position and/or the orientation of the image sensor.

17. The system of claim 8, further comprising:
  an actuator, operably coupled to the processor and to the image sensor, to adjust a field of view of the image sensor based at least in part on the object.

18. The system of claim 17, wherein the actuator is further configured to adjust the field of view of the image sensor based at least in part on the change in the position and/or the orientation of the image sensor.

19. The method of claim 1, wherein the object is a previously unknown new object.

20. The method of claim 1, further comprising:
  determining that the spatial shroud does not fit the form of the object in a third image in the plurality of images; and in response to determining that the spatial shroud does not fit the form of the object in the third image, identifying a second object in the third image different from the object; and transmitting instructions to the image sensor to capture images of the second object.

21. The method of claim 1, wherein constructing the spatial shroud occurs without supervision from a user.

22. The method of claim 1, wherein constructing the spatial shroud occurs without manual labeling of the object.

23. The method of claim 1, wherein constructing the spatial shroud occurs without corrupting or forgetting previously learned knowledge.

* * * * *